US012568167B2

(12) United States Patent
Gorny et al.

(10) Patent No.: US 12,568,167 B2
(45) Date of Patent: Mar. 3, 2026

(54) SYSTEM AND METHOD OF CAPTURING, TRACKING, COMPOSING, ANALYZING AND AUTOMATING ANALOG AND DIGITAL INTERACTIONS

(71) Applicant: Nextiva, Inc., Scottsdale, AZ (US)

(72) Inventors: Tomas Gorny, Scottsdale, AZ (US); Raymond Allan Harker, Phoenix, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 862 days.

(21) Appl. No.: 17/894,544

(22) Filed: Aug. 24, 2022

(65) Prior Publication Data

US 2022/0407958 A1      Dec. 22, 2022

Related U.S. Application Data

(63) Continuation of application No. 17/009,490, filed on Sep. 1, 2020, now Pat. No. 11,463,579, which is a
(Continued)

(51) Int. Cl.
*H04M 3/42*          (2006.01)
*H04M 3/493*        (2006.01)
(Continued)

(52) U.S. Cl.
CPC ... *H04M 3/42365* (2013.01); *H04M 3/42238* (2013.01); *H04M 3/493* (2013.01); *H04M 3/5166* (2013.01); *H04M 3/5315* (2013.01)

(58) Field of Classification Search
CPC ......... H04M 2201/18; H04M 2201/40; H04M 2203/559; H04M 3/42238;
(Continued)

(56) References Cited

U.S. PATENT DOCUMENTS 7,606,168 B2    10/2009  Robinson et al.
8,239,460 B2     8/2012  Meek et al.
(Continued)

FOREIGN PATENT DOCUMENTS

AU          2013338351 A1 *   5/2015   ........... G06Q 30/016

OTHER PUBLICATIONS

Townsend et al., Fig. 9, Aug. 18, 2010, US-2012/0047517A1 (Year: 2010).*
(Continued)

*Primary Examiner* — Matthew C Sams
(74) *Attorney, Agent, or Firm* — Spencer Fane LLP; Steven J. Laureanti

(57)          ABSTRACT

A system and method are disclosed for capturing, tracking, analyzing and automating analog and digital interactions. Embodiments include a system comprising one or more end user systems, one or more entity systems, and a computer operatively coupled to a display device. The computer is configured to monitor one or more communications on first and second communication channels between the end user and entity systems, group the one or more communications on the first and second communication channels by communication subject, and display the grouped communications on the display device.

20 Claims, 9 Drawing Sheets

Related U.S. Application Data continuation of application No. 16/419,882, filed on May 22, 2019, now Pat. No. 10,778,838.

(60) Provisional application No. 62/778,134, filed on Dec. 11, 2018.

(51) Int. Cl.
H04M 3/51 (2006.01)
H04M 3/53 (2006.01)

(58) Field of Classification Search
CPC ............. H04M 3/42365; H04M 3/493; H04M 3/5166; H04M 3/5175; H04M 3/5315
See application file for complete search history.

(56) References Cited

U.S. PATENT DOCUMENTS

| | | | |
|---|---|---|---|
| 8,457,300 B2 | 6/2013 | Hemm et al. | |
| 8,468,545 B2 * | 6/2013 | Townsend ............... | G06F 16/93 |
| | | | 719/313 |
| 8,983,975 B2 | 3/2015 | Kenton et al. | |
| 9,219,704 B2 | 12/2015 | Hamlin et al. | |
| 9,258,143 B2 | 2/2016 | Chavez | |
| 9,392,112 B2 * | 7/2016 | Vymenets ........... | H04M 3/5232 |
| 9,413,891 B2 | 8/2016 | Dwyer et al. | |
| 9,450,771 B2 | 9/2016 | Browning et al. | |
| 9,596,196 B1 | 3/2017 | Hills | |
| 9,832,151 B2 | 11/2017 | Kumar et al. | |
| 9,979,807 B2 * | 5/2018 | Konnerth .......... | H04M 3/42059 |
| 10,061,867 B2 | 8/2018 | Lev et al. | |
| 10,084,913 B2 | 9/2018 | Montenegro et al. | |
| 10,169,447 B2 | 1/2019 | Ghafourifar et al. | |
| 10,467,854 B2 | 11/2019 | Sri et al. | |
| 10,553,208 B2 | 2/2020 | Nelson et al. | |
| 10,574,623 B2 | 2/2020 | Geppert et al. | |
| 10,664,661 B2 | 5/2020 | Gorny | |
| 10,778,838 B2 | 9/2020 | Gorny et al. | |
| 11,093,568 B2 | 8/2021 | Guan et al. | |
| 11,955,113 B1 * | 4/2024 | Stephenson ......... | H04M 3/2218 |
| 2001/0024497 A1 * | 9/2001 | Campbell ........... | H04M 3/5191 |
| | | | 379/265.09 |
| 2010/0246571 A1 | 9/2010 | Geppert et al. | |
| 2012/0047517 A1 * | 2/2012 | Townsend ........... | H04M 3/5191 |
| | | | 709/227 |
| 2013/0185285 A1 | 7/2013 | Shuman et al. | |
| 2014/0081691 A1 * | 3/2014 | Wendell .......... | G06Q 10/06311 |
| | | | 705/7.15 |
| 2014/0164256 A1 * | 6/2014 | Booij ................. | H04M 3/5231 |
| | | | 705/304 |
| 2014/0379818 A1 | 12/2014 | Cudak et al. | |
| 2015/0339373 A1 | 11/2015 | Carlson et al. | |
| 2017/0171373 A1 * | 6/2017 | Konnerth ........... | H04M 1/2746 |
| 2018/0165582 A1 | 6/2018 | Cha | |
| 2019/0220777 A1 | 7/2019 | Johnson et al. | |

OTHER PUBLICATIONS

PCT International Search Report; International Application No. PCT/US19/45447; Oct. 28, 2019; 2 pages.

UK Search Report; GB Application No. GB2303018.2; Mar. 20, 2023; 1 page.

EU Search Report; EP Application No. EP19897040; Jul. 27, 2022; 8 pages.

* cited by examiner

FIG. 5

SYSTEM AND METHOD OF CAPTURING, TRACKING, COMPOSING, ANALYZING AND AUTOMATING ANALOG AND DIGITAL INTERACTIONS

CROSS-REFERENCE TO RELATED APPLICATIONS

This application is a continuation of U.S. patent application Ser. No. 17/009,490, filed on Sep. 1, 2020, entitled "System and Method of Capturing, Tracking, Composing, Analyzing and Automating Analog and Digital Interactions," which is a continuation of U.S. patent application Ser. No. 16/419,882, filed on May 22, 2019, entitled "System and Method of Capturing, Tracking, Composing, Analyzing and Automating Analog and Digital Interactions," now U.S. Pat. No. 10,778,838, which claims the benefit under 35 U.S.C. § 119(e) to U.S. Provisional Application No. 62/778,134, filed Dec. 11, 2018, and entitled "System and Method of Capturing, Tracking, Composing, Analyzing and Automating Analog and Digital Interactions." U.S. patent application Ser. No. 17/009,490, U.S. Pat. No. 10,778,838, and U.S. Provisional Application No. 62/778, 134 are assigned to the assignee of the present application. The subject matter disclosed in U.S. patent application Ser. No. 17/009,490, U.S. Pat. No. 10,778,838, and U.S. Provisional Application No. 62/778,134 is hereby incorporated by reference into the present disclosure as if fully set forth herein.

TECHNICAL FIELD

The present disclosure relates generally to a fully integrated communication platform servicing multiple communication channels and specifically to capturing, tracking, composing, analyzing and automating analog and digital interactions.

BACKGROUND

Customer-facing companies and entities must field, sort, manage, and respond to hundreds or thousands of customer communications on a daily basis. Prior solutions that attempt to manage and organize this information have approached the problem one communication channel (such as telephone or email) at a time. However, this at best provides an undesirable outcome, as this approach forces users to rely on multiple tools and multiple interfaces instead of a single interface to manage and respond to customer communications.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 5 illustrates an exemplary user interface generated by the graphical user interface module of FIG. 2, according to an embodiment;

DETAILED DESCRIPTION

Figure 1:
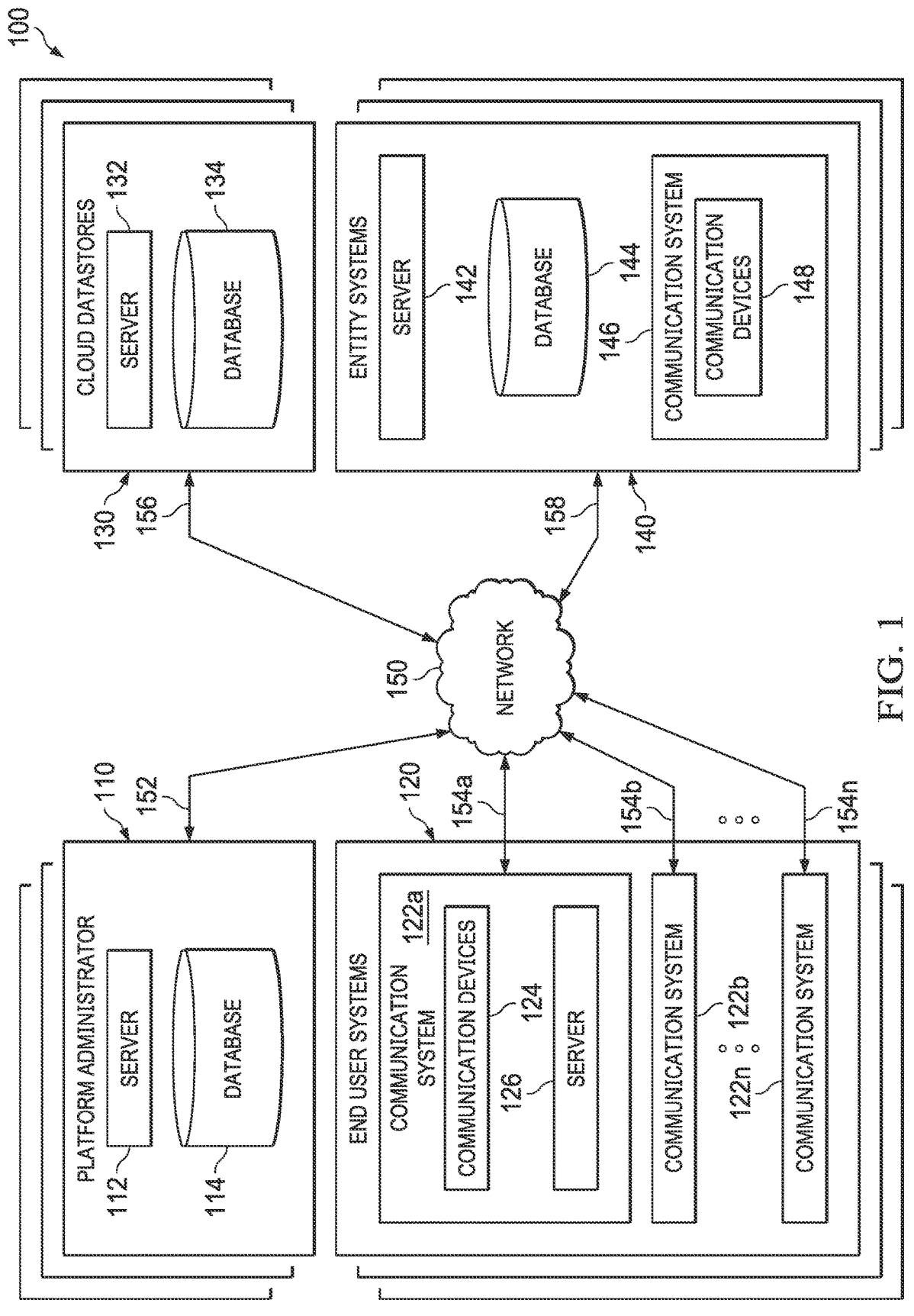
FIG. 1 illustrates an exemplary communication platform, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to a system and method of coordinating volumes of customer communications, interactions, and responses to customers across multiple communication channels. Embodiments of the following disclosure provide a communication platform that monitors interactions, such as, for example, any communication or interaction that shares or transmits information or data between at least two communication devices. Embodiments provide a single interface and process for capturing and storing data related to interactions, assigning priority rankings to interactions, organizing interactions into topic-related groups, interpreting the urgency, severity, and type of interactions, and coordinating responses to interactions across separate communication channels. In addition, the communications platform sorts interactions by context, and may generate automated responses to interactions based on the interpreted urgency or content of the interaction.

Embodiments of the following disclosure may manage hundreds or thousands of interactions on a daily basis and across a variety of communication channels in an efficient process, allowing businesses to service their customers and/or end user base more efficiently by reducing computational run time of computer systems. In addition, or as an alternative, embodiments provide for a persona-based experience for a user of the system described herein, such that the display of the different types of interactions is organized based on the identity of the user and the user adding, editing and/or deleting the interactions. Embodiments thereby provide, among other things, a reduction of computational run-time of a computer system in responding to hundreds and thousands of incoming interactions.

FIG. 1 illustrates exemplary communication platform 100, according to a first embodiment. Communication platform 100 comprises one or more platform administrators 110, one or more end user systems 120, one or more cloud datastores 130, one or more entity systems 140, network 150, and communication links 152-158. Although one or more platform administrators 110, one or more end user systems 120, one or more cloud datastores 130, one or more entity systems 140, network 150, and communication links 152-158 are shown and described, embodiments contemplate any number of platform administrators 110, end user systems 120, cloud datastores 130, entity systems 140, networks 150, or communication link 152, according to particular needs.

In one embodiment, platform administrator 110 comprises server 112 and database 114. Server 112 is programmed to monitor interactions between one or more end user systems 120 and one or more entity systems 140. Database 114 comprises one or more databases or other data storage arrangements at one or more locations local to, or remote from, platform administrator 110. In one embodiment, one or more databases 114 is coupled with one or more servers 112 using one or more local area networks (LANs), metropolitan area networks (MANs), wide area networks (WANs), network 150, such as, for example, the Internet, or any other appropriate wire line, wireless link, or any other communication link. One or more databases 114 stores data that is made available and may be used by one or more servers 112 according to the operation of communication platform 100.

According to embodiments, one or more end user systems 120 comprises end users such as, for example, a buyer, a customer, a retailer, or any other individual, business, or enterprise which communicates with one or more entity systems 140. One or more end user systems 120 comprise one or more communication systems 122 that send and/or receive interactions to and from one or more entity systems 140 utilizing one or more communication channels. Although a particular number of communication systems 122a-122n are shown and described, embodiments contemplate each end user system 120 comprising any number of communication systems 122, according to particular needs.

Communication systems 122 may comprise communication devices 124 and server 126, and include any system located at one or more end user systems 120 that is configured to send and receive interactions with one or more entity systems 140. Each communication device 124 may provide one or more end user systems 120 and one or more entity systems 140 with a communication channel between the one or more end user systems 120 and one or more entity systems 140. Communication devices 124 may comprise, for example, one or more of land-line telephones, cellular phones, computers, laptop computers, notebook computers, tablet-type devices, smartphones, terminals, or any other suitable communication device.

One or more end user systems 120 may be coupled with one or more entity systems 140 by network 150 via communication links 154. Although communication links 154a-154n are shown connecting communication systems 122a-122n, respectively, to network 150, embodiments contemplate any number of communication links 154a-154n connecting any number of communication systems 122 with network 150, according to particular needs. In alternative embodiments, communication links 154 may connect one or more communication systems 122 directly to one or more entity systems 140. Communication links 154 may comprise one or more communication channels, as described in more detail below. Platform administrator 110 may monitor the interactions between one or more entity systems 140 and one or more end user systems 120 and may record the interactions between a single end user or multiple end users and one or more entity systems 140.

According to embodiments, one or more cloud datastores 130 comprise server 132 and database 134. One or more cloud datastores 130 provide for the storage of data and hosting of programs or applications. According to embodiments, server 132 of one or more cloud datastores 130 hosts and runs one or more runtime processes associated with platform administrator 110. Server 132 comprises any server configured to access, update and provide data associated with one or more platform administrators 110, one or more end user systems 120 or one or more entity systems 140. Database 134 comprises one or more databases or other data storage arrangements at one or more locations, local to, or remote from, one or more platform administrators 110. In one embodiment, one or more databases 134 is coupled with one or more servers 132 using one or more LANs, WANs, MANs, network 150, such as, for example, the Internet, or any other appropriate wire line, wireless, or any other communication link. One or more databases 134 store data that is made available and may be used by one or more end users 120, one or more servers 132, and one or more entity systems 140 according to the operation of communication platform 100.

According to embodiments, one or more entity systems 140 comprise any entity that communicates with one or more end users, including its own end users, the end users of other entity systems 140, and/or one or more end user systems 120. One or more entity systems 140 may comprise, for example, a business, company, entity, enterprise, distributor, retailer, call center, CRM specialist system, customer service system, help desk system, or any entity system that communicates with end users, either its own end users or the end users of other entity systems 140. One or more entity systems 140 may comprise one or more servers 142 and one or more databases 144, or other data storage arrangements at one or more locations which are integral to or separate from the hardware and/or software that supports communication platform 100.

In addition, or as an alternative, each of the one or more entity systems 140 may comprise one or more communication systems 146 that send or receive interactions to and from one or more end user systems 120. Communication system 146 may comprise communication devices 148, and include any system located at one or more entity systems 140 that is configured to send and receive interactions over one or more communication channels. Each communication device 148 may provide one or more entity systems 140 and one or more end user systems 120 a communication channel between one or more end user systems 120 and one or more entity systems 140. One or more end user systems 120 may utilize platform administrator 110 to monitor the interactions between one or more entity systems 140 and one or more end user systems 120 and determine a sentiment score based on one or more sentiment criteria, as discussed in more detail below. In addition, communication systems 146 may each operate on separate computer systems or may operate on one or more shared computer systems. Each of these one or more computer systems may comprise a work station, personal computer, network computer, laptop computer, notebook computer, tablet-type device, smartphone, terminal, or any other suitable communication device.

According to embodiments, one or more platform administrators 110 including server 112 and database 114 is coupled with network 150 using communication link 152, which may be any wireline, wireless, or other link suitable to support data communications between one or more platform administrators 110 and network 150. One or more end user system 120 communication systems 122a-122n are coupled with network 150 using communication links 154a-154n, which may be any wireline, wireless, or other link suitable to support data communications between one or more communication systems 122 and network 150. One or more cloud datastores 130, including server 132 and database 134, are coupled with network 150 using communication link 156, which may be any wireline, wireless, or other link suitable to support data communications between one or more cloud datastores 130 and network 150. One or more entity systems 140, including server 142 and database 144, are coupled with network 150 using communication link 158, which may be any wireless or other link suitable to support data communications between one or more entity systems 140 and network 150.

Although communication links 152-158 are shown as generally coupling one or more platform administrators 110, one or more end user systems 120, one or more cloud datastores 130, and one or more entity systems 140 with network 150, one or more platform administrators 110, one or more end user systems 120, one or more cloud datastores 130, and one or more entity systems 140 may communicate directly with each other according to particular needs.

In an embodiment, network 150 includes the Internet, telephone lines, any appropriate LANs, MANs, or WANs, and any other communication network coupling one or more platform administrators 110, one or more end user systems 120, one or more cloud datastores 130, and one or more entity systems 140. For example, data may be maintained by one or more platform administrators 110 or one or more cloud datastores 130 at the one or more locations external to one or more platform administrators 110 and/or one or more cloud datastores 130, and made available to one or more platform administrators 110, one or more end user systems 120, one or more cloud datastores 130, or one or more entity systems 140 using network 150 or in any other appropriate manner. Those skilled in the art will recognize that the complete structure and operation of network 150 and other components within communication platform 100 are not depicted or described. Embodiments may be employed in conjunction with known communications networks 150 and other components.

According to embodiments, one or more platform administrators 110, one or more end user systems 120, one or more cloud datastores 130, and/or one or more entity systems 140 may each operate on one or more computers that are integral to or separate from the hardware and/or software that supports communication platform 100. In addition, or as an alternative, the one or more users or representatives may be associated with communication platform 100 including one or more platform administrators 110, one or more end user systems 120, one or more cloud datastores 130, and/or one or more entity systems 140. These one or more users may include, for example, one or more computers programmed to autonomously handle monitoring interactions between one or more entity systems 140 and one or more end user systems 120 and/or the one or more related tasks within communication platform 100. As used herein, computer, the term "computer," and "computer system" comprise an input device and an output device. The input device includes any suitable input device, such as a keypad, mouse, touch screen, microphone, or other device to input information. The output device comprises any suitable output device that may convey information associated with the operation of communication platform 100, including digital or analog data, visual information, or audio information. Furthermore, the one or more computers include any suitable fixed or removable non-transitory computer-readable storage media, such as magnetic computer disks, CD-ROMs, or other suitable media to receive output from and provide input to communication platform 100. The one or more computers also include one or more processors and associated memory to execute instructions and manipulate information according to the operation of communication platform 100.

Although a single user is described above as being associated with one or more end user systems 120, embodiments contemplate more than one end user associated with each end user system 120. For example, if an end user represents an organization or entity, more than one individual may be associated with the organization or entity that contacts one or more entity systems 140. Likewise, although a single point of contact, i.e., a representative is described as being associated with one or more entity systems 140, embodiments contemplate more than one point of contact, i.e., multiple representatives at one or more entity systems 140. For example, and as discussed below, if one or more entity systems 140 is an entity which services and repairs products, end users may speak with different representatives of entity systems 140 to inquire about, for example, warranty of a product or the sale of a new product and at separate or concurrent time periods.

According to embodiments, platform administrator 110 monitors interactions between one or more end user systems 120 and one or more entity systems 140. Platform administrator stores information relating to each interaction, such as, for example, the date and time of the interaction, the communication channel associated with the interaction, and the content of the interaction (including but not limited to text transcripts of email, chat, or other written interactions, transcripts of voice interactions such as over a telephone line, and recorded audio files of voice interactions) in one or more database 114 or 134. Platform administrator 110 may analyze these stored interactions and group them into one or more topic-related threads. Platform administrator 110 may then display to one or more users these topic-related threads, permitting the visualization of interactions between one or more end user systems 120 and one or more entity systems 140 across communication channels, subjects, and instances of time.

According to embodiments, communication platform 100 platform administrator 110 may analyze the one or more interactions that constitute the one or more topic-related threads, and may assess a sentiment score, discussed in greater detail below, that estimates whether the one or more users associated with the one or more end user systems 120 involved in the interactions are satisfied or dissatisfied with the interactions which the one or more end user systems 120 have shared with the one or more entity systems 140. Based on this sentiment score, platform administrator may automatically generate and send one or more interactions to end user systems 120. Communication platform 100 may thereby manage, store, assess, and generate automated responses to thousands of interactions on a daily basis and across a variety of communication channels.

Figure 2:
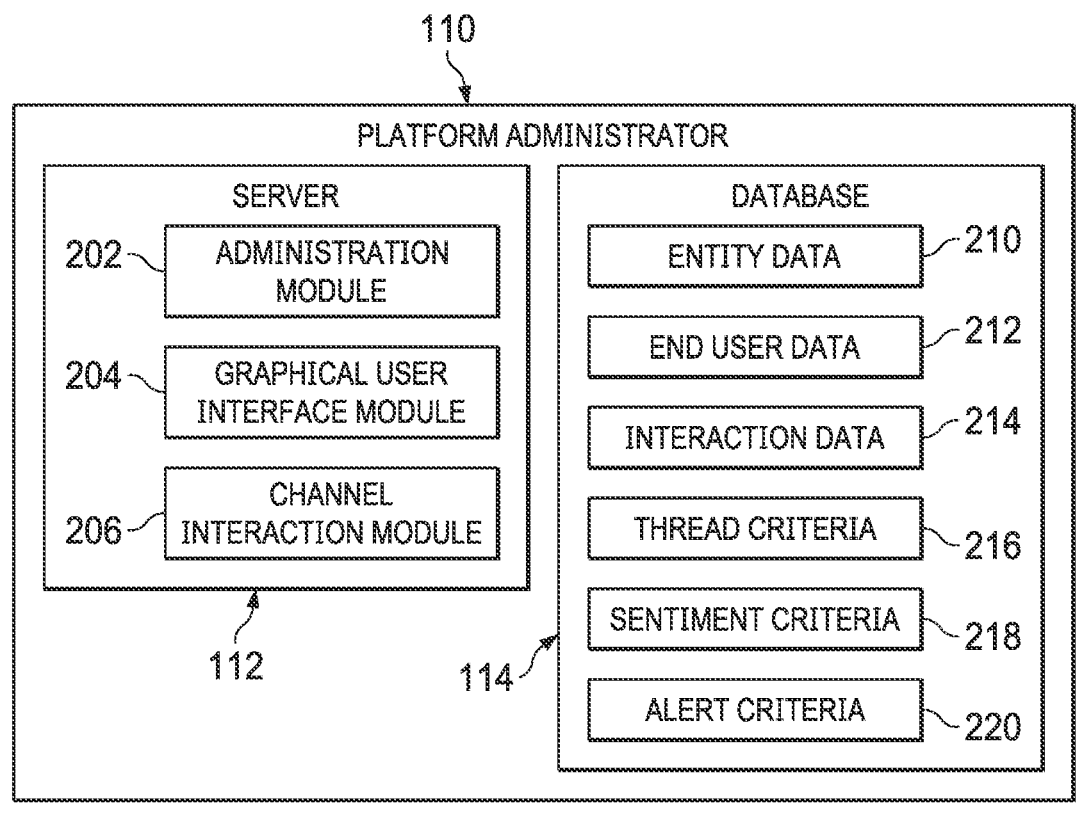
FIG. 2 illustrates the platform administrator of FIG. 1 in greater detail, according to an embodiment.

FIG. 2 illustrates platform administrator 110 of FIG. 1 in greater detail, according to an embodiment. As discussed above, platform administrator 110 comprises one or more computers at one or more locations including associated input devices, output devices, non-transitory computer-readable storage media, processors, memory, or other components to send and receive interactions between one or more end user systems 120 and one or more entity systems 140 according to the operation of communication platform 100. In addition, and as discussed in more detail below, platform administrator 110 comprises server 112 and database 114. Although platform administrator 110 is described as comprising a single server 112 and database 114, embodiments contemplate any suitable number of servers 112 or databases 114 internal to or externally coupled with platform administrator 110. In addition, or as an alternative, platform administrator 110 may be located internal to one or more entity systems 140. In other embodiments, platform administrator 110 may be located external to one or more entity systems 140 and may be located in, for example, a corporate or regional entity of one or more entity systems 140, according to particular needs.

Server 112 comprises administration module 202, graphical user interface module 204, and channel interaction module 206. Although a particular configuration of server 112 is shown and described, embodiments contemplate any suitable number or combination of administration modules 202, graphical user interface modules 204, and channel interaction modules 206, located at one or more locations, local to, or remote from, platform administrator 110, according to particular needs. In addition, or as an alternative, administration module 202, graphical user interface module 204, and channel interaction module 206 may be located on multiple servers 112 or computers at any location in communication platform 100.

Database 114 comprises entity data 210, end user data 212, interaction data 214, thread criteria 216, sentiment criteria 218, and alert criteria 220. Although database 114 is shown and described as comprising entity data 210, end user data 212, interaction data 214, thread criteria 216, sentiment criteria 218, and alert criteria 220, embodiments contemplate any suitable number or combination of entity data 210, end user data 212, interaction data 214, thread criteria 216, sentiment criteria 218, alert criteria 220, and other data pertaining to communication platform 100 located at one or more locations, local to, or remote from, platform administrator 110, according to particular needs.

Entity data 210 of database 114 contains the identification information of one or more entity systems 140, such as, for example, names, addresses, company contact information, telephone numbers, email, IP addresses, and the like. Although certain particular entity data 210 are described, embodiments contemplate any type of entity data 210 associated with one or more entity systems 140 or communication devices 148, according to particular needs. In one embodiment, administration module 202 uses entity data 210 to identify one or more entity systems 140 in communication platform 100 to generate particular configurations of communication platform 100 specific to each entity system 140. According to embodiments, entity data 210 may comprise a list of tasks which entity system 140 will perform in a specified period of time (such as, for example, contacting a specified number of end user systems 120).

End user data 212 of database 114 may comprise information regarding end user systems 120 which utilize communication devices 124 to contact one or more entity systems 140, or may comprise information regarding communication systems 122 or communication devices 124 directly. End user data 212 may comprise, for example, user ID, user social security number, user age, user sex, user language, user education and the like. Although certain particular end user data 212 are described, embodiments contemplate any type of end user data 212 associated with one or more end user systems 120 or communication devices 124, according to particular needs. According to embodiments, end user data 212 may comprise a list of events associated with one or more end user systems (such as, for example, data regarding a particular end user's birthday).

Interaction data 214 of database 114 may comprise information regarding interactions between one or more end user systems 120 and communication devices 124 with one or more entity systems 140 and communication devices 148. Interaction data 214 may also comprise organization and setup data for channel interaction module 206. According to embodiments, interaction data 214 comprises the particular communication channels, which are available to a particular end user system 120 or entity system 140, the times at which communication channels are available, the protocols or metadata that describe particular interactions, and/or any other setup data necessary to configure channel interaction module 206.

In addition, or as an alternative, interaction data 214 is not constrained by preconfigured or preset relationships. Instead, platform administrator 110 server 112 may store interaction data 214 in tables and fields of database 114 or cloud datastore 130 and may construct a post-storage relationship based on, for example, a relationship builder, a learning engine and/or a rules engine. For example, administration module 202 may build relationships between interactions stored in interaction data 214 by grouping interactions which share a participating entity (such as a customer, account, or company), method of engagement (such as a survey, case, sale, or marketing event), or one or more of any thread criteria 216, as discussed in more detail below.

Thread criteria 216 of database 114 may comprise information, which enables administration module 202 of server 112 to analyze interaction data 214 and detect related interaction topics across separate communication channels, lengths of time, and communication systems 122 and 146. Administration module 202 may access thread criteria 216 in database 114 and use it to group interactions stored in interaction data 214 into one or more topic-related threads, as described in more detail below.

Thread criteria 216 may comprise, for example, name criteria (which instructs administration module 202 to group all interactions containing a particular end user system 120 or entity system 140 user name into one or more topic-related threads); time criteria (which instructs administration module 202 to group all interactions which took place at a specific date or time into one or more topic-related threads); event criteria (which instructs administration module 202 to group all interactions which pertain to a particular survey, advertising campaign, or other defined event into one or more topic-related threads), subject criteria (which instructs administration module 202 to group all interactions which pertain to a defined subject, such as, for example, a product sale or an account service matter), and/or keyword criteria (which instructs administration module 202 to group all interactions containing one or more keywords, such as, for example, "Password Repair" into one or more topic-related threads). Although certain particular thread criteria 216 are described, embodiments contemplate any type of thread criteria 216 associated with database 114, according to particular needs. In an embodiment, having created one or more topic-related threads, administration module 202 stores information regarding the one or more topic-related threads in interaction data 214.

Sentiment criteria 218 of database 114 may comprise information which enables administration module 202 of server 112 to analyze interactions stored in interaction data 214 and assign each interaction a sentiment score, as described in more detail below. Sentiment scores provide data inferring the feeling, behavior, viewpoint, and/or mindset of one or more end users of one or more end user systems 120 and/or one or more representatives of one or more entity systems 140 who participated in the particular interaction. Administration module 202 may access sentiment criteria 218 in database 114 and use it to assign a sentiment score to each interaction stored in interaction data 214. For example, administration module 202 may access one or more sentiment criteria 218 and perform a subjective analysis of the emotions of the words used in a particular interaction, and may score the words with a numerical value sentiment score, such as, for example, a numerical value between 0 and 100, wherein 0 represents a highly negative end user interaction and sentiment score, and 100 represents a highly positive end user interaction and sentiment score.

In addition, sentiment criteria 218 may comprise, for example, keyword criteria, which instruct administration module 202 to assign a lower sentiment score to a particular interaction if words such as "frustrated" or "cancel" are present in that interaction, and to assign a higher sentiment score if words such as "happy" or "resolved" are present. Embodiments further contemplate one or more end user systems 140 directly accessing sentiment criteria 218 and setting numerical values for sentiment scores. Although certain particular numerical values of the sentiment score and sentiment criteria 218 are described, embodiments contemplate any numerical value of the sentiment score and any type of sentiment criteria 218, according to particular needs. In an embodiment, having created one or more sentiment scores for one or more interactions, administration module 202 stores information regarding the one or more sentiment scores in interaction data 214.

Alert criteria 220 of database 114 may comprise information, which enables administration module 202 of server 112 to analyze interactions stored in interaction data 214 and generate an alert when one or more alert criteria 220 occur, as described in more detail below. For example, alert criteria 220 may instruct administration module 202 to generate an alert when administration module 202 assigns a sentiment score to a particular interaction that is below a specified value. Alternatively, alert criteria 220 may instruct administration module 202 to generate an alert when administration module 202 assigns a sentiment score to an interaction which administration module 202 has assigned to a particular topic-related threads that is a specified value below the sentiment score of the immediately preceding interaction in the topic-related thread. Alert criteria 220 may further comprise instructions for administration module 202 to trigger an alert when channel interaction module 206 stores a particular interaction (such as, for example, a particular interaction type or an interaction, which took place over a particular communication channel) in interaction data 214. Although particular alert criteria 220 are described, embodiments contemplate any type of alert criteria 220, according to particular needs. In an embodiment, having created one or more alerts for one or more interactions, administration module 202 stores information regarding the one or more alerts in interaction data 214.

Administration module 202 of server 112 may configure, update, and/or manage the operation of platform administrator 110. That is, administration module 202 may configure, update, and/or manage the broader operation of communication platform 100 and change which data is executed and/or stored on platform administrator 110, one or more end user systems 120, one or more cloud datastores 130, or one or more entity systems 140. Communication platform 100 may comprise a user-configurable system, such that platform administrator 110 may store entity data 210, end user data 212, and/or interaction data 214 either singularly or redundantly in database 114, one or more end user systems 120, and/or one or more entity systems 140, according to particular needs. In addition, or as an alternative, administration module 202 captures interaction data 214 from multiple sources, such as, for example, one or more end user systems 120, one or more entity systems 140, one or more cloud datastores 130, and/or other third-party sources, and stores interaction data 214 in database 114. According to other embodiments, channel interaction module 206 monitors, processes, updates, creates, and stores entity data 210, end user data 212, and/or interaction data 214 in database 114, as discussed in more detail below.

Graphical user interface module 204 of server 112 generates a graphical user interface comprising entity data 210, end user data 212, interaction data 214, and sentiment scores, such as, for example: generating charts, storing and retrieving historical data of customer relationship management, and displaying notifications. Graphical user interface module 204 stores and retrieves data from database 114 including entity data 210, end user data 212, interaction data 214, and sentiment scores, which may be stored in interaction data 214. According to embodiments and as discussed in more detail below, graphical user interface module 204 generates a graphical user interface display comprising details of one or more interactions (such as, for example, a telephone call between an end user system 120 communication device 124 and an entity system 140) including, for example, the types of relationships. In addition, or as an alternative, graphical user interface module 204 may generate a graphical user interface display communicating interaction activity details each time a user of one or more end user systems 120 initiates an interaction, each time the representative of the one or more systems responds, and/or for the entire interaction activity history.

According to other embodiments, graphical user interface module 204 may generate different graphical user interface displays conveying different types of information about interactions between one or more end user systems 120 and one or more entity systems 140. By way of example only and not by way of limitation, graphical user interface module 204 may generate different graphical user interface displays, each displaying alternative combinations of entity data 210, end user data 212, interaction data 214, thread data 216, sentiment scores or sentiment criteria 218, and/or alerts or alert criteria 220, for different users of one or more end user systems 120 or entity systems 140. Administration module 202 of platform administrator 110 may access entity data 210 and end user data 212, and use entity data 210 and/or end user data 212 to determine the identity of one or more specific users associated with one or more end user systems 120 or entity systems 140. Administration module 202 may transmit user identity information to graphical user interface module 204. Graphical user interface module 204 may then generate a specific graphical user interface display comprising a user-specific combination of entity data 210, end user data 212, interaction data 214, thread data 216, sentiment scores or sentiment criteria 218, and/or alerts or alert criteria 220.

According to embodiments, graphical user interface module 204 may generate unique graphical user interface displays for, for example, account manager users or for agent users. Although unique graphical user interface displays generated for account managers or agents are described herein, embodiments contemplate graphical user interface module 204 generating unique graphical user interface displays in any configuration for any number or type of unique communication platform 100 users, according to particular needs. For example, graphical user interface module 204 may generate a graphical user interface display for an account manager, displaying all interactions associated with a particular end user system 120 customer account across all communication channels and business situations. As another example and for an agent, graphical user interface module 204 may generate a graphical user interface display for an agent, displaying all interactions associated with a particular end user system 120 customer, across all communication channels.

Channel interaction module 206 of server 112 monitors and records interaction activity between one or more end user systems 120 and one or more entity systems 140. For example, channel interaction module 206 monitors interactions between one or more end user systems 120 and one or more entity systems 140 across one or more communication channels. According to embodiments, channel interaction module 206 records the time, duration, date, voice, text, and other interaction activity information and transcribes any voice communication, and stores this data in interaction data 214 of database 114.

According to embodiments, administration module 202 may access information stored in thread criteria 216 and use thread criteria 216 to group interactions stored in interaction data 214 into one or more topic-related threads. In addition, administration module 202 may group interaction data 214 into topic-related threads by case interactions, sale interactions, contact interactions, and the like, according to particular needs and thread criteria 216. For example, administration module 202 may determine, via thread criteria 216, that all interactions between a particular end user and a particular entity system 140 which occurred within a specified duration of time relate to a specific topic (such as, for example, that end user attempting to cancel a product or service purchased from one or more entity systems 140). According to embodiments, administration module 202 may group all interactions associated with a particular end user regardless of the communication channel, into a single topic-related thread including interactions from entity system 140 to the particular end user. In this way, administration module 202 may organize individual interactions between end user systems 120 and entity systems 140 across different communication channels and different periods of time.

According to embodiments and as discussed in more detail below, administration module 202 may organize interactions between one or more end user systems 120 and one or more entity systems 140 according to various thread criteria 216, including, for example, the time of an interaction, the individual that initiated the interaction, the communication channel used for the interaction, the subject of the interaction, and other interaction information, and group interaction activities by topic into one or more threads of communication. By utilizing interaction data 214, administration module 202 improves and automates monitoring, interactions-based machine learning, and interaction thread building. According to embodiments, administration module 202 automates tasks such as determining a sentiment score based on sentiment criteria 218.

Figure 3:
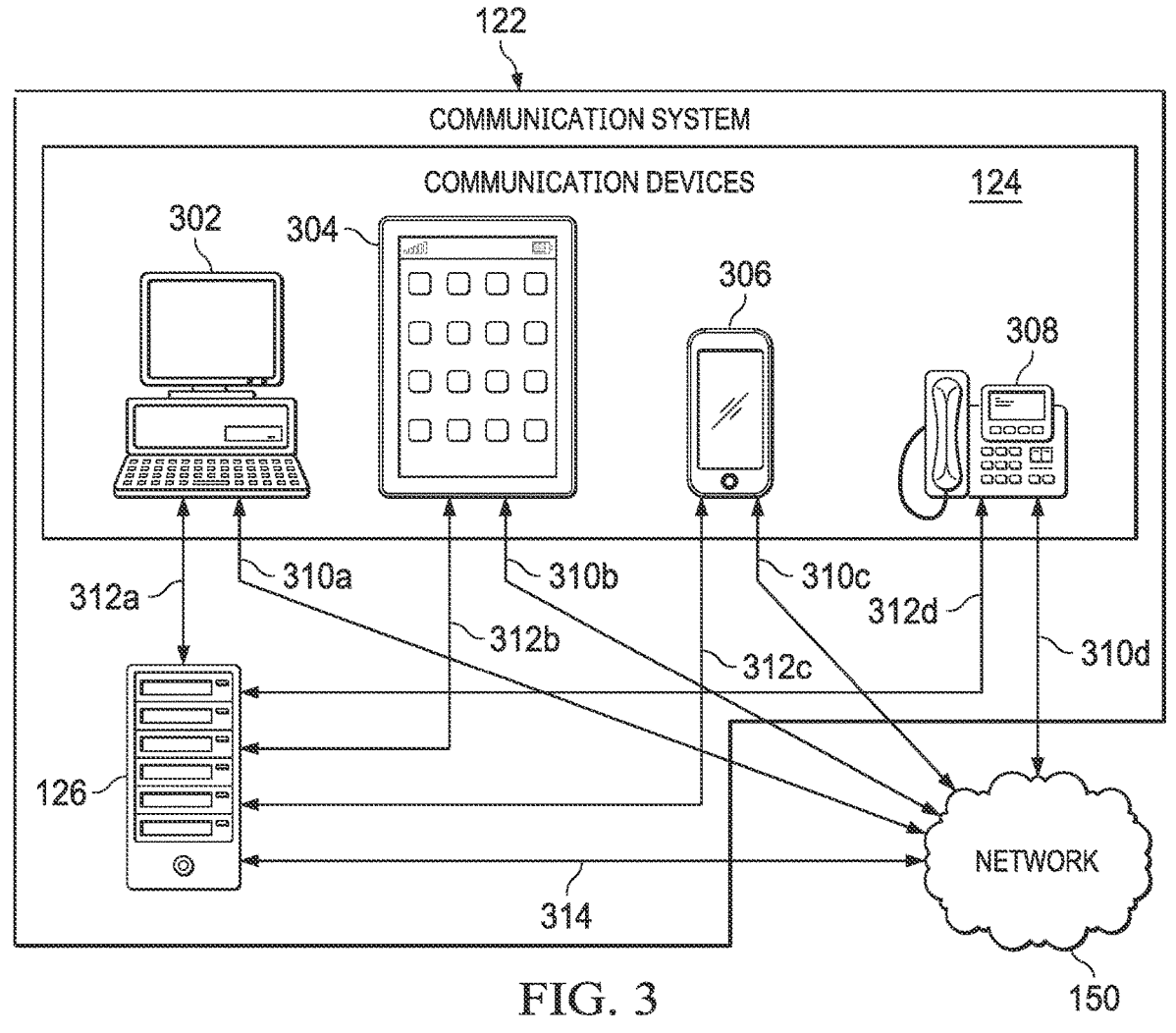
FIG. 3 illustrates the communication systems of FIG. 1 in greater detail, according to an embodiment.

FIG. 3 illustrates communication systems 122a-122n of FIG. 1 in greater detail according to an embodiment. Communication systems 122a-122n may comprise communication devices 124, server 126, and/or communication channels 310-314 which may be configured to communicate with network 150, one or more platform administrators 110, one or more cloud datastores 130, and communication devices 148 of one or more entity systems 140. In one embodiment, one or more communication systems 122a-122n may each operate on separate computer systems or may operate on one or more shared computer systems. Each of these one or more computer systems may be a computer system 302, such as a work station, personal computer, network computer, laptop computer, notebook computer, tablet-type device 304, smartphone 306, terminal, or any other suitable communication device 124. In addition, communication devices 124 may comprise a land-line or VoIP telephone 308. According to embodiments each of the communication devices 124 are configured to communicate with communication devices 148 over a communication channel. In addition, or as an alternative each of one or more communication systems 146 may also operate on separate computer systems or may operate on one or more shared computer systems, which may comprise a computer system 302, such as a work station, personal computer, network computer, laptop computer, notebook computer, tablet-type device 304, smartphone 306, terminal, or any other suitable communication device 148.

Computer system 302, one or more tablet-type devices 304, smartphones 306, and land-line or VoIP telephone 308 may comprise a processor, memory and data storage. The processor may execute an operating system program stored in memory to control the overall operation of computer system 302, one or more tablet-type devices 304 and/or smartphones 306. For example, the processor may control the reception of signals and the transmission of signals within communication platform 100. The processor may execute other processes and programs resident in memory, such as, for example, registration, identification or communication over the communication channels and move data into or out of the memory, as required by an executing process.

Those skilled in the art will recognize that one or more specific examples of communication systems 122a-122n are given by way of example and that for simplicity and clarity, only so much of the construction and operation of one or more communication systems 122a-122n as is necessary for an understanding of the present invention is shown and described. Moreover, it is understood that one or more communication systems 122a-122n should not be construed to limit the types of devices in which embodiments of the present invention may be implemented. For example, one or more communication systems 122a-122n may be any device, including, but not limited to, conventional cellular or mobile telephones, smart mobile phones, an iPhone, an iPad, wireless tablet devices, paging devices, personal digital assistant devices, short message service (SMS) wireless devices, portable computers, or any other device capable of wireless or network communication.

According to embodiments, platform administrator 110 may assign each of the one or more communication devices 124 and 148 (see FIG. 1) one or more identification numbers, such as IP addresses, serial numbers, or telephone numbers that may be used to identify communication devices 124 and 148. According to some embodiments, each communication device 124 and 148 is associated with an identification number, such as an IP or MAC address. In addition, or as an alternative, communication systems 122*a*-122*n* may be local to or remote from one or more end user systems 120 and one or more entity systems 140. That is, communication devices 124 of one or more end user systems 120 may communicate with communication devices 146 of one or more entity systems 140. For example, platform administrator 110 is programmed to monitor and analyze interactions via communication channels, such as, for example, telephone calls, emails, instant, chat or text messaging, posting to social media, blogs, or newsgroups, and any other interactions activity between communication devices 124 of one or more end user systems 120 and communication devices 148 of one or more entity systems 140.

Figure 4:
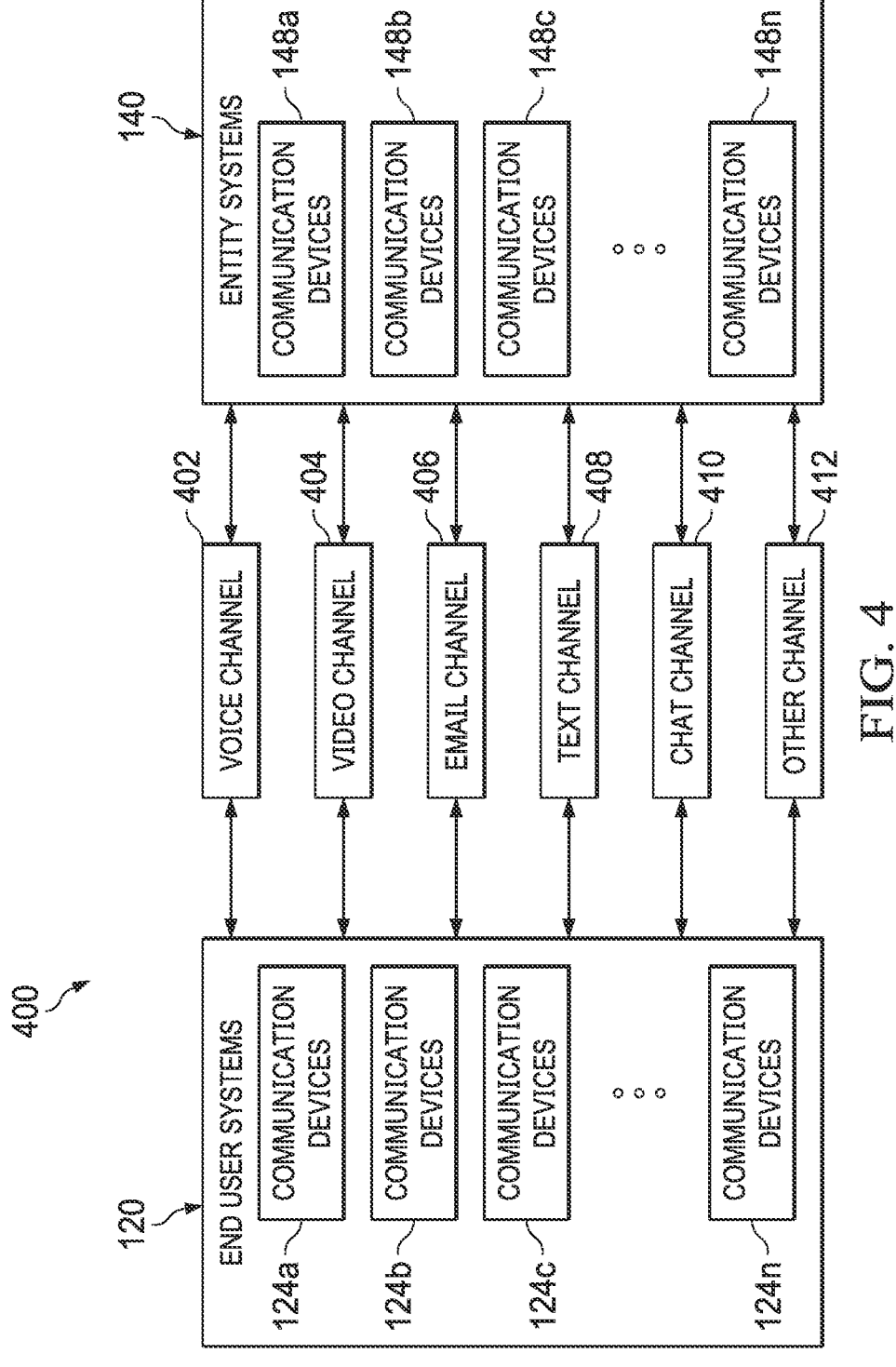
FIG. 4 illustrates the communication channels associated with the end user system and entity system of FIG. 1 in greater detail, according to an embodiment.

FIG. 4 illustrates communication channels 400 associated with end user system 120 and entity system 140 of FIG. 1 in greater detail, according to an embodiment. As discussed above, communication devices 124*a*-124*n* of end user system 120 may communicate with communication devices 148*a*-148*n* of entity system 140 via communication channels 400. According to embodiments, communication channels 400 comprise voice channel 402, video channel 404, email channel 406, text channel 408, chat channel 410, and other channel 412. Communication channels 400 comprise the separate channels through which telecommunications devices send and receive information, and may include, for example, telephone lines, emails and electronic communications over the Internet, instant messages, text messages, or other communication channels presently available or which may be developed in the future. For example, in an embodiment, end user system 120 communication device 124 may comprise a land line telephone 308, which a user may use to communicate with entity system 140 communication device 148 via a telephone land line communication channel.

In order to illustrate interactions between one or more end user systems 120 and one or more entity systems 140, an example is now given. In the following example, entity system 140 comprises an entity that services and repairs products, and end user system 120 comprises communication devices 124*a*-124*n* which communicate with entity system 140 communication devices 148*a*-148*n* over different communication channels. Continuing with the example, a user of end user system 120 may utilize smartphone 306 to communicate with a representative of entity system 140 using voice channel 402 to inquire about various warranty issues. On another occasion, the same user may use another communication device 124 or the same communication device 124 to communicate with a different representative of entity system 140 using another communication channel, such as an email channel 406, to inquire about one or more new products or services. Although particular communication devices 124 and associated communication channels 402-412 are shown and described, embodiments contemplate any number of users associated with communication devices 124, any number of representatives associated with communication devices 148, and any number of communication channels, according to particular needs.

Continuing with the above example, platform administrator 110 may monitor and record data regarding the first interaction over voice channel 402 and the second interaction over email channel 406. Platform administrator 110 may use such information to group the interaction activity into a continuous topic-related thread, using one or more criteria, to allow communication platform 100 to track interactions pertaining to a particular topic, event, or matter across different communication channels and interactions, as discussed in more detail below.

Figure 5:
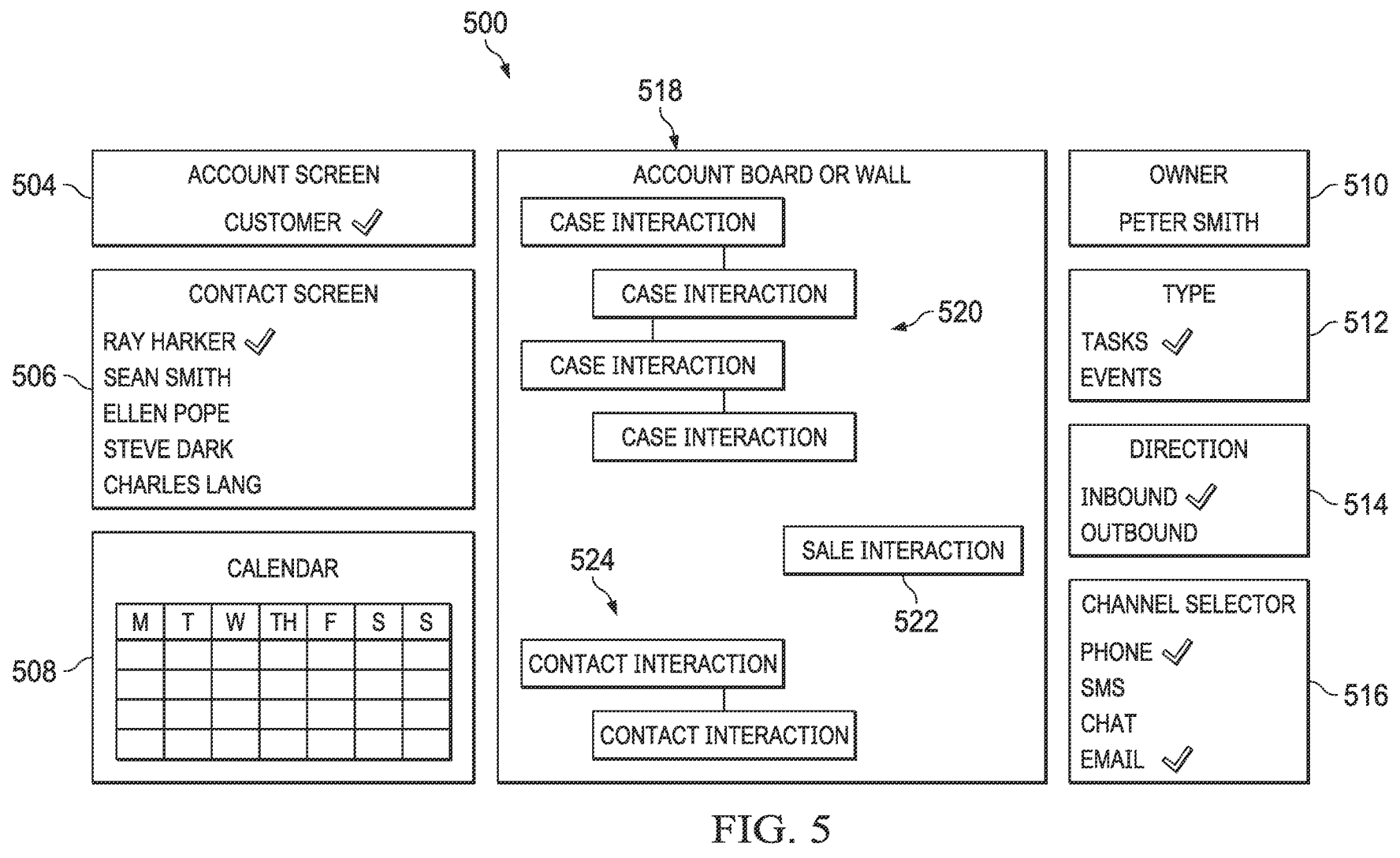

FIG. 5 illustrates exemplary user interface 500 generated by graphical user interface module 204 of FIG. 2, according to an embodiment. User interface 500 comprises account screen 504, contact screen 506, calendar screen 508, owner screen 510, type screen 512, direction screen 514, channel selector screen 516 and account board 518. Although user interface 500 is shown and described as comprising one of each of account screen 504, contact screen 506, calendar screen 508, owner screen 510, type screen 512, direction screen 514, channel selector screen 516 and account board 518, embodiments contemplate graphical user interface module 204 generating and displaying any suitable number or types of screens.

According to embodiments, administration module 202 accesses entity data 210 and end user data 212, and determines the accounts and contacts associated with one or more entity systems 140 and end user systems 120. Administration module 202 transmits this data to graphical user interface module 204, which displays these accounts on account screen 504 and these contacts on contact screen 506. According to embodiments, administration module 202 accesses interaction data 214, and more specifically the dates and times at which particular interactions occurred, for one or more interactions. Administration module 202 transmits this data to graphical user interface module 204, which displays this date and time information for particular interactions on calendar screen 508.

According to embodiments, administration module 202 accesses entity data 210 and instructs graphical user interface module 204 to display information regarding various users of one or more entity systems 140 on owner screen 510. According to embodiments, administration module 202 accesses entity data 210 and end user data 212, and instructs graphical user interface module 204 to display information regarding tasks or events associated with one or more entity systems 140 and/or one or more end user systems 120 on type screen 512. Administration module 202 may access interaction data 214 and instruct graphical user interface module 204 to display information specifying whether a particular interaction was "inbound" (wherein an end user system 120 contacted entity system 140), or "outbound" (wherein entity system 140 contacted end user system 120), on direction screen 514. Administration module 202 may access interaction data 214 and instruct graphical user interface module 204 to display information specifying the communication channel 400 on which a particular interaction occurred on channel selector screen 516.

According to embodiments, administration module 202 accesses entity data 210, end user data 212, interaction data 214, thread criteria 216, sentiment criteria 218, and alert criteria 220, and instructs graphical user interface module 204 to display, on account board 518, a plurality of information regarding end user systems 120, entity systems 140, and interactions and threads between end user systems 120 and entity systems 140, as described in greater detail below.

According to embodiments, channel interaction module 206 monitors interactions between one or more end user systems 120 and one or more entity systems 140, and stores information related to these interactions in interaction data 214. Administration module 202 accesses interaction data 214 and thread criteria 216 and determines if a particular interaction activity conversation, email or text is sent in context to a particular topic, whether the interaction is outbound or inbound, how many interactions have taken place with respect to the particular topic, and all content that is included in the interaction between one or more end user systems 120 and one or more entity systems 140 related to that topic. Administration module 202 then transmits this data to graphical user interface module 204, which uses it to generate user interface 500 with respect to a particular topic. For example, and as shown in FIG. 5, administration module 202 may access interaction data 214 and thread criteria 216, and group interactions into threads organized by case interaction 520 (comprising multiple threaded interactions grouped into a single topic), sale interaction 522 (comprising a single interaction and topic), contact interaction 524 (comprising multiple threaded interactions grouped into a single topic), or other interactions, according to particular needs. Administration module 202 may then instruct graphical user interface module 204 to display information regarding case interaction 520, sale interaction 522, and contact interaction 524 on account board 518. Although a particular number of interactions and topics are shown and described on account board 518 of FIG. 5, embodiments contemplate any number of interactions and topics displayed by graphical user interface module 204 on any number of screens, according to particular needs.

According to embodiments, administration module 202 grades interactions and prioritizes them based on the communication channel 400 involved, the content of the interaction activity, the frequency of previous interaction activities, thread criteria 216, alert criteria 220, or other variables. In an embodiment, administration module 202 accesses sentiment criteria 218 to grade and prioritize interactions. Administration module 202 then instructs graphical user interface module 204 to display information regarding interactions using channel selector screen 516, including, for example, the communication channels 400 involved in a particular topic. For example, in an embodiment in which the most recently-used communication channel 400 for interactions associated with a particular topic is text channel 408, administration module 202 accesses sentiment criteria 218 and may assign a higher response priority to the topic than if the most recently-used communication channel 400 were email channel 406. In an alternative example, in an embodiment in which the previously-used communication channel 400 for interactions associated with a particular topic is voice channel 402, and the communication channel 400 of the most recent interaction associated with the particular topic is email channel 406, administration module 202 accesses sentiment criteria 218 and determines that the urgency of the particular topic has likely decreased due to the end user's decision to communicate with entity system 140 over email instead of voice communications. In this alternative example, administration module 202 assigns a lower response priority to this topic. Although particular examples of administration module 202 grading interactions and threads according to certain thread criteria 216 are discussed, embodiments contemplate administration module 202 grading interactions and threads using any criteria, according to particular needs.

Figure 6:
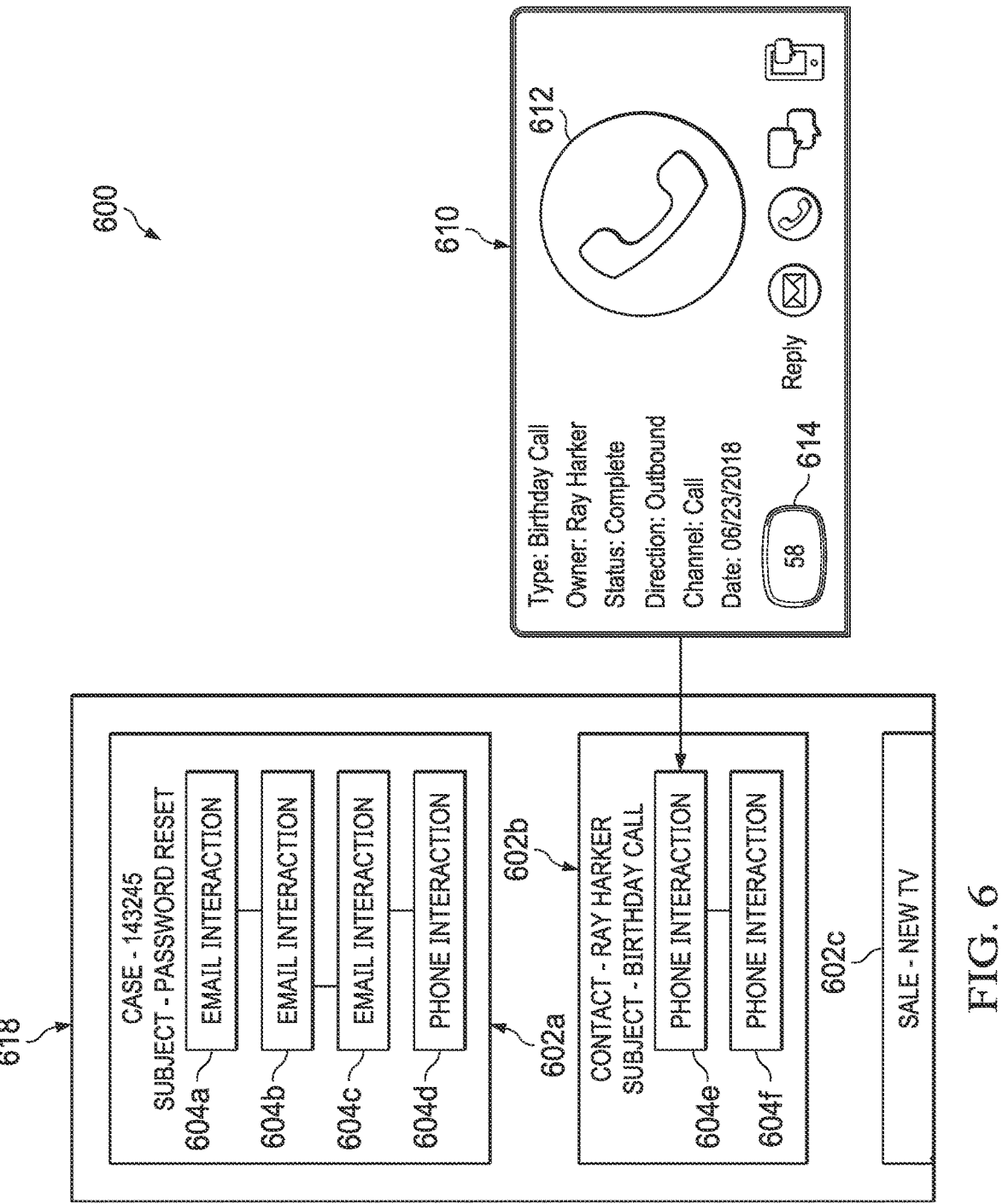
FIG. 6 illustrates an exemplary user interface comprising an account board, according to an embodiment.

FIG. 6 illustrates an exemplary user interface 600 comprising account board 618, according to an embodiment. Account board 618 comprises grouped interaction threads 602a-602c, interaction activities 604a-604f, interaction detail screen 610, communication channel icon 612, and sentiment score 614. Although FIG. 6 illustrates account board 618 displaying grouped interaction threads 602a-602c, interaction activities 604a-604f, interaction detail screen 610, communication channel icon 612, and sentiment score 614, embodiments contemplate graphical user interface module 204 displaying any number of grouped interaction threads 602, interaction activities 604, interaction detail screens 610, communication channel icons 612, and sentiment scores 614, according to particular needs.

According to embodiments, administration module 202 accesses interaction data 214 and thread criteria 216. Administration module 202 uses thread criteria 216 to group the interactions stored in interaction data 214 into one or more topic-related threads. In the particular example illustrated by FIG. 6, administration module 202 groups the interactions stored in interaction data 214 into three grouped interaction threads 602a-c, and instructs graphical user interface module 204 to display each of grouped interaction threads 602a-c on account board 618. Although grouped interaction threads 602a-c are shown and described, embodiments contemplate administration module 202 grouping any number of grouped interaction threads 602 from interaction data 214 using thread criteria 216, according to embodiments.

Continuing the example, grouped interaction thread 602a comprises interaction activities 604a-604d. According to embodiments, channel interaction module 206 of server 112 monitors interactions between one or more end user systems 120 and one or more entity systems 140, and stores each interaction as a discrete interaction activity 604 in interaction data 214. Interaction activity 604 may comprise any form of communication between one or more end user systems 120 and one or more entity systems 140, such as an email, a phone call, a text message, or any other communication.

Continuing the example, interaction activities 604a-604d comprise email interactions (604a-604c) and one phone interaction (604d) between entity system 140 and a user associated with end user system 120. Administration module 202, utilizing thread criteria 216, associates interaction activities 604a-604d with a particular case topic (in this example "Case—143245"), and groups them together into grouped interaction thread 602a. Administration module 202 then commands graphical user interface module 204 to display grouped interaction thread 602a using account board 618. Although grouped interaction thread 602a depicts interaction activities 604a-604d which comprise email and phone interactions, alternative embodiments contemplate any number of grouped interaction threads 602 comprising any number of interaction activities 604, further comprising any communication channel or type of interaction, according to particular needs.

Administration module 202 evaluates interaction activities 604a-604d using thread criteria 216, and determines they are associated with a particular subject matter (in this example, "Password Reset"). Administration module 202 assigns grouped interaction thread 602a the subject of "Password Reset," and instructs graphical user interface module 204 to display this subject associated with grouped interaction thread 602a on account board 618. In this example, end user system 120 sent interaction activity 604a to entity system 140 in the form of an outbound email. Entity system 140 then replied via email interaction activity 604b. End user system 120 sent a follow-up email to entity system 140 in interaction activity 604c. Entity system 140 then called end user system 120 at interaction activity 604d.

Continuing the above example, administration module 202 and graphical user interface module 204 utilize the same process described above in relation to grouped interaction thread 602a and interaction activities 604a-604d to generate grouped interaction thread 602b, comprising interaction activities 604e-604f, and to display grouped interaction thread 602b and interaction activities 604e-604f on account board 618. Interaction activities 604e and 604f comprise phone interactions between entity system 140 and end user system 120. Administration module 202 accesses thread criteria 216 and associates interaction activities 604*e* and 604*f* with a particular contact (in this example, "Contact—Ray Harker"), and a particular subject (in this example, "Birthday Call") and groups them together into grouped interaction thread 602*b*. Administration module 202 transfers information regarding grouped interaction thread 602*b* to graphical user interface module 204, which displays grouped interaction thread 602*b* on account board 618. In this example, entity system 140 sent interaction activity 604*e* to end user system 120 in the form of an outbound phone call to end user Ray Harker. End user system 120 then replied via activity 604*f* in the form of a second phone call.

Continuing the above example, administration module 202 and graphical user interface module 204 utilize the same process described to generate grouped interaction thread 602*c*, and to display grouped interaction thread 602*c* on account board 618. The space constraints of account board 618 prevent graphical user interface module 204 from displaying specific interaction activities associated with grouped interaction thread 602*c*. According to embodiments, subsequent account boards 718 (illustrated in FIG. 7) and 818 (illustrated in FIG. 8) display interaction activity 604 information pertaining to grouped interaction thread 602*c*, as described in more detail below.

Exemplary user interface 600 further comprises interaction detail screen 610. According to embodiments, administration module 202 selects one or more types of information regarding a particular interaction activity 604, such as, for example, interaction activity 604 type, subject, status, direction (outbound or inbound), associated communication channel 400, or date, to be displayed on interaction detail screen 610. Although certain information regarding a particular interaction activity 604 are described, embodiments contemplate administration module 202 selecting any type of information stored in interaction data 214, according to embodiments. Having selected information regarding a particular interaction activity 604, administration module 202 transmits this information to graphical user interface module 204, which displays the information using interaction detail screen 610.

In an embodiment, interaction detail screen 610 comprises communication channel icon 612 and sentiment score 614. Communication channel icon 612 indicates the communication channel 400 on which the associated interaction activity 604 took place. For example, if the associated interaction activity 604 occurred over a phone call, communication channel icon 612 may indicate this communication channel 400 by displaying an icon of a phone handset, the words "Phone Call", or any other means to display the relevant communication channel 400. Although certain exemplary communication channel icons 612 are described, embodiments contemplate any manner of communication channel icons 612, according to particular needs.

According to embodiments, interaction detail screen 610 may comprise sentiment score 614. As is further discussed below, administration module 202 may access sentiment criteria 218 in database 114 and utilize one or more sentiment criteria 218 to measure the sentiment of one or more interaction activities 604 stored in interaction data 214. Administration module 202 may assign a sentiment score 614 to each of the one or more interaction activities 604 stored in interaction data 214, and may transmit this information to graphical user interface module 204, which may in turn display sentiment scores 614 on account board 618 interaction detail screen 610 or other user interfaces in communication platform 100.

Figure 7:
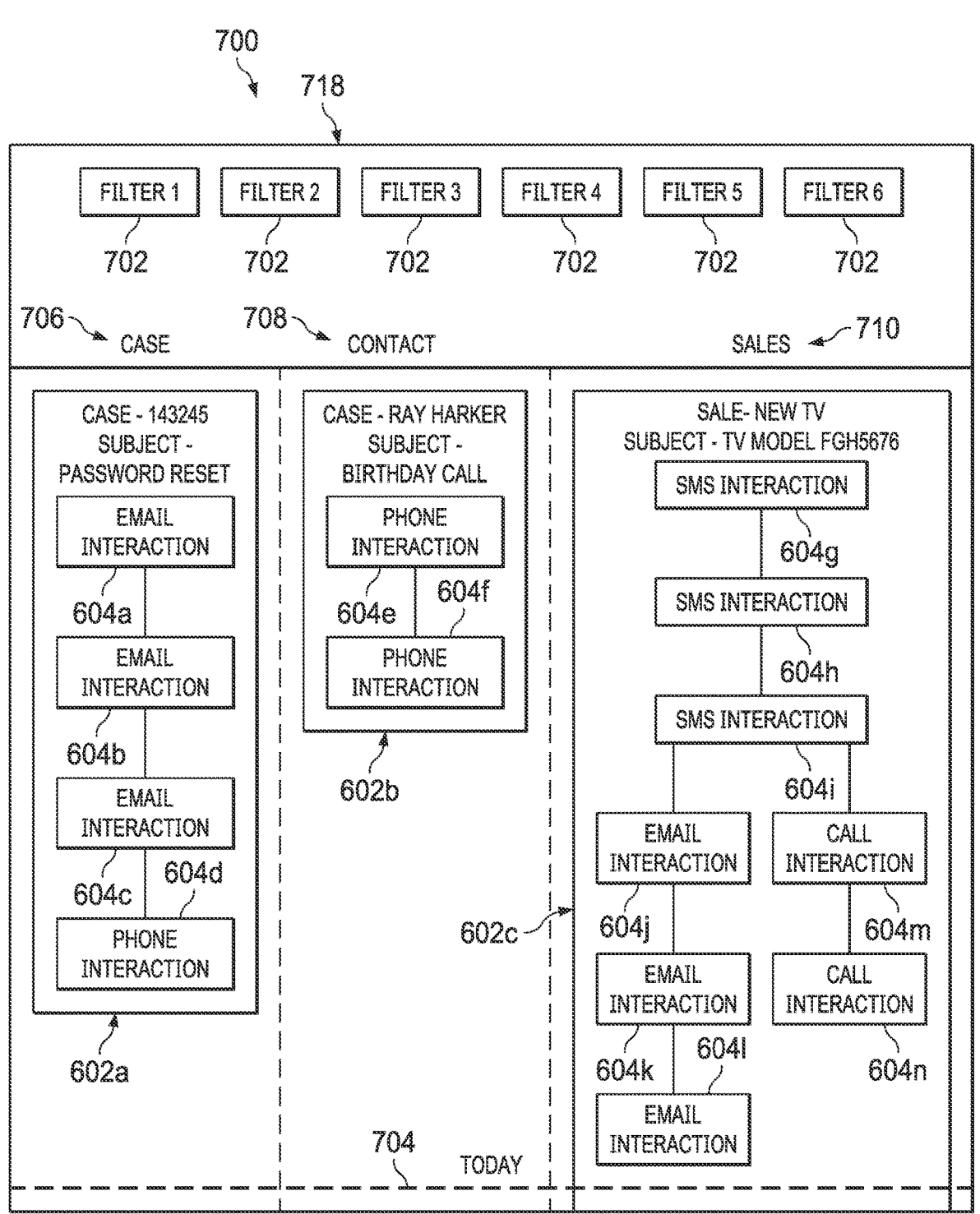
FIG. 7 illustrates an exemplary user interface comprising another account board, according to an embodiment.

FIG. 7 illustrates exemplary user interface 700 comprising another account board 718, according to an embodiment. Account board 718 comprises grouped interaction threads 602*a*-602*c*, interaction activities 604*a*-604*n*, filters 702, date divider 704, and case 706, contact 708, and sale 710 common subject headers. Although FIG. 7 illustrates account board 718 displaying grouped interaction threads 602*a*-602*c*, interaction activities 604*a*-604*n*, filters 702, date divider 704, and case 706, contact 708, and sale 710 common subject headers, embodiments contemplate graphical user interface module 204 displaying any number of grouped interaction threads 602, interaction activities 604, filters 702, date dividers 704, or common subject headers, according to particular needs.

In one embodiment, administration module 202 accesses entity data 210, end user data 212, interaction data 214, and thread criteria 216. Administration module 202 uses thread criteria 216 to group one or more interactions stored in interaction data 214 into grouped interaction threads 602. For example, and as illustrated in FIG. 7, administration module 202 groups interactions into grouped interaction threads 602*a*-602*c*, which comprise interaction activities 604*a*-604*n*. Administration module 202 transmits data pertaining to grouped interaction threads 602*a*-602*c* to graphical user interface module 204, which displays grouped interaction threads 602*a*-602*c* and interaction activities 604*a*-604*n* on account board 718.

In this embodiment, administration module 202 commands graphical user interface module 204 to arrange grouped interaction threads 602*a*-602*c* on account board 718 on a horizontal axis (wherein grouped interaction thread 602*a* is on the left side of account board 718, grouped interaction thread 602*b* is in the center, and grouped interaction thread 602*c* is on the right). This arrangement may enable, for example, the graphical representation of interaction activities 604 across multiple grouped interaction threads 602 according to the date and time at which each interaction activity 604 took place. For example, graphical user interface module 204 may display interaction activities 604 in a manner arranged chronologically, wherein upper interaction activities 604 took place before lower interaction activities 604. For organizational purposes, administration module 202 may instruct graphical user interface module 204 to display one or more date dividers 704 on account board 718. Date dividers 704 may comprise one or more dates (such as, for example, the current date, or a specified date or time) which visually separate or organize information displayed on account board 718.

According to embodiments, administration module 202 may command graphical user interface module 204 to further organize information which graphical user interface module 204 displays on account board 718 according to common subject headers. Common subject headers may comprise, for example, case 706, contact 708, and sales 710 common subject headers. Although one or more case 706, contact 708, and sales 710 common subject headers are shown and described, embodiments contemplate any number of common subject headers according to particular needs.

According to embodiments, administrator module 202 may command graphical user interface module 204 to display all interaction activities 604 associated with a particular case (such as, for example, a particular matter, such as "Password Reset," concerning a specific end user of end user system 120) under the case 706 common subject header. Administrator module 202 may command graphical user interface module 204 to display all interaction activities 604 associated with a particular contact (such as, for example, a specific user of end user system 120) under the contact 708 common subject header. Administrator module 202 may command graphical user interface module 204 to display all interaction activities 604 associated with a particular sale (such as, for example, the sale of a particular TV model) under the sales 710 common subject header.

Continuing the above example and with respect to FIG. 7, interaction activity 604*a* in grouped interaction thread 602*a* occurred before interaction activity 604*f* in grouped interaction thread 602*b*, whereas interaction activity 604*d* followed both interaction activities 604*a* and 604*f*. In this way, graphical user interface module 204 arranges information on account board 718 that allows a user to quickly sort and organize multiple grouped interaction threads 602 by interaction chronology. Among other things, chronology organization provides context to things that may occur at the same time.

Still continuing the above example, account board 718 displays more detailed information (as compared to account board 618) regarding grouped interaction thread 602*c* interaction activities 604*g*-604*n*. Interaction activities 604*g*-604*n* comprise SMS interactions (604*g*-604*i*), email interactions (604*j*-604*l*), and call interactions (604*m*-604*n*) between entity system 140 and a user associated with end user system 120. Administration module 202 accesses thread criteria 216 and associates interaction activities 604*g*-604*n* with a particular topic (in this example "Sale—New TV"), and groups them together into grouped interaction thread 602*c*, which graphical user interface module 204 displays using account board 718.

Administration module 202 evaluates interaction activities 604*g*-604*n* using thread criteria 216, and determines that they pertain to a particular subject matter (in this example, "TV Model FGH5676"). Administration module 202 assigns grouped interaction thread 602*c* the subject of "TV Model FGH5676," which graphical user interface module 204 displays on account board 718. Interaction activities 604*g*-604*n* of grouped interaction thread 602*c* are further discussed below.

According to embodiments and continuing the above example, graphical user interface module 204 generates account board 718 displaying filters 702. Filters 702 allow a user to organize or sort grouped interaction threads 602*a*-602*c* and interaction activities 604*a*-604*n* by name, contact, subject, type, channel, or any other type of variable.

Figure 8:
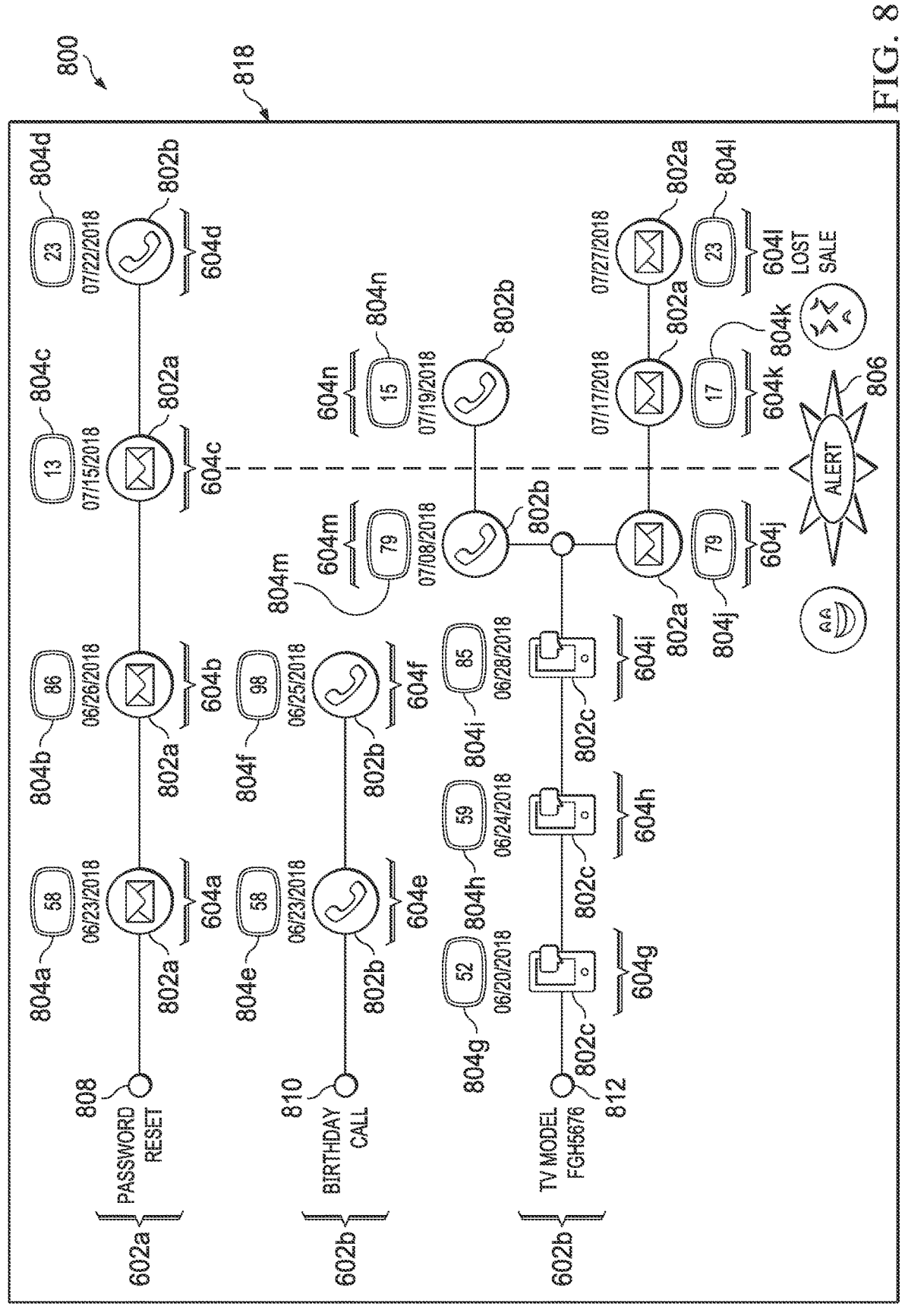
FIG. 8 illustrates an exemplary user interface comprising another account board comprising a multi-path interaction chart, according to an embodiment.

FIG. 8 illustrates an exemplary user interface 800 comprising account board 818 comprising a multi-path interaction chart, according to an embodiment. Account board 818 comprises grouped interaction threads 602*a*-602*c*, interaction activities 604*a*-604*n*, communication channel icons 802, sentiment scores 804*a*-804*n*, alert 806, and common subjects 808, 810, and 812. Although FIG. 8 illustrates account board 818 displaying grouped interaction threads 602*a*-602*c*, interaction activities 604*a*-604*n*, communication channel icons 802, sentiment scores 804*a*-804*n*, alert 806, and common subjects 808, 810, and 812, embodiments contemplate graphical user interface module 204 displaying any number of grouped interaction threads 602, interaction activities 604, communication channel icons 802, sentiment scores 804, alerts 806, and common subjects 808, according to particular needs.

According to embodiments, administration module 202 accesses entity data 210, end user data 212, interaction data 214, thread criteria 216, sentiment criteria 218, and alert criteria 220. Administration module 202 uses thread criteria 216 to group one or more interactions stored in interaction data 214 into one or more grouped interaction threads 602. For example, and as illustrated in FIG. 8, administration module 202 groups interactions into grouped interaction threads 602*a*-602*c*, which comprise interaction activities 604*a*-604*n*. Administration module 202 transmits data pertaining to grouped interaction threads 602*a*-602*c* and interaction activities 604*a*-604*n* to graphical user interface module 204, which displays grouped interaction threads 602*a*-602*c* and interaction activities 604*a*-604*n* on account board 818.

In this embodiment, administration module 202 commands graphical user interface module 204 to arrange grouped interaction threads 602*a*-602*c* on account board 818 in a multi-path interaction chart. More specifically, administration module 202 commands graphical user interface module 204 to display interaction data 214 pertaining to grouped interaction threads 602*a*-602*c* and interaction activities 604*a*-604*n* in a horizontal multi-path interaction chart configuration on account board 818. As described in more detail below, the multi-path interaction chart configuration comprises multiple paths of grouped interaction threads 602*a*-602*c*, displayed in a communication channel 400 agnostic manner on a horizontal axis having separate interaction activities 604*a*-604*n*.

According to embodiments and continuing the above example, the multi-path interaction chart configuration of account board 818 lists interaction activities 604*a*-604*n* of grouped interaction threads 602*a*-602*c* chronologically from left to right, organized by the date on which each interaction activity 604 occurred, with earlier interaction activities 604 on the left of account board 818 and later interaction activities 604 on the right. Alternative embodiments contemplate graphical user interface module 204 displaying interaction activities 604*a*-604*n* of grouped interaction threads 602*a*-602*c* organized in any other manner, such as alphabetically, or sorted by communication channel 400.

In the embodiment illustrated in FIG. 8, administration module 202 accesses information stored in interaction data 214 regarding which communication channel 400 is associated with each interaction activity 604*a*-604*n*. Administration module 202 transmits this information to graphical user interface module 204, which uses it to display communication channel icons 802*a*-802*c* associated with each interaction activity 604 on account board 818.

For example, communication channel icon 802*a* indicates the particular associated interaction activity 604*a* took place via email. Communication channel icon 802*b* indicates the particular associated interaction activity 604*b* took place via phone communication. Communication channel icon 802*c* indicates the particular associated interaction activity 604*c* took place via SMS message. Alternative embodiments contemplate any number of communication channel icons 802, depending on the associated communication channels available in communication platform 100.

In addition, or as an alternative, embodiments provide for administration module 202 monitoring and scoring interaction activities 604 based on, for example, sentiment scores 804. That is, administration module 202 accesses sentiment criteria 218 in database 114 and uses one or more sentiment criteria 218 to measure the sentiment of one or more interaction activities 604 stored in interaction data 214, as previously described above. Administration module 202 may assign a sentiment score 804 to each of the one or more interaction activities 604 stored in interaction data 214, and may transmit this information to graphical user interface module 204, which may in turn display sentiment scores 804 on account board 818 or other user interfaces in communication platform 100.

According to embodiments, sentiment score 804 provides a real-time indicator inferring the feeling, behavior, viewpoint and/or mindset of the end user of one or more end user systems 120 and the representative of one or more entity systems 140 at a particular point in time and based on, for example, the specific words communicated between the end user system 120 and entity system 140 which comprise a particular interaction activity 604. For example, administration module 202 may access sentiment criteria 218 and perform a subjective analysis of the emotions connoted by the words communicated in a particular interaction activity 604, and may score interaction activity 604 with a numerical value sentiment score 804 (such as, for example, a numerical value between 0 and 100, wherein 0 represents a negative end user interaction and sentiment score 804 and 100 represents a positive end user interaction and sentiment score 804). According to embodiments, administration module 202 may transmit sentiment score 804 to graphical user interface module 204, which may display interaction activity 604 sentiment score 804 using numerical values, color codes, a series of phrases such as "Happy," "Satisfied," "Content," "Not Satisfied," and "Not Happy," or any other visual indicator.

Continuing with the above example, administration module 202 calculates sentiment scores 804a-804n for each interaction activity 604a-604n (wherein administration module 202 calculates sentiment score 804a for interaction activity 604a, sentiment score 804b for interaction activity 604b, and so on), and transmits sentiment scores 804a-804n to graphical user interface module 204. Graphical user interface module 204 then displays sentiment scores 804a-804n associated with interaction activities 604a-604n on account board 818. According to embodiments, administration module 202 may track sentiment scores 804 of interaction activities 604 to determine whether the sentiment scores 804 of interaction activities 604 associated with a particular grouped interaction thread 602 are escalating or de-escalating with each new interaction activity 604.

The following continued example illustrates the operation of the multi-path interaction chart of account board 818, according to an embodiment. Channel interaction module 206 monitors interaction activities 604 across communication platform 100, including interaction activities 604a-604n between an end user (henceforth, "Ray Harker") of end user system 120 and the service department of entity system 140 across multiple communication channels 400, and stores interaction activity 604 information in interaction data 214. Administration module 202 accesses interaction data 214 and, using thread criteria 216, groups interaction activities 604a-604d into grouped interaction thread 602a based on common subject 808 ("Password Reset"). Interaction activity 604a comprises an email Ray Harker sent to entity system 140 service department on Jun. 23, 2018. Administration module accesses sentiment criteria 218 and analyzes the text content of email interaction activity 604a, and assigns it sentiment score 804a of 58. Interaction activity 604b comprises an email sent from entity system 140 to Ray Harker on Jun. 26, 2018, to which administration module 202 assigns a sentiment score 804b of 86. Interaction activity 604c comprises a reply email Ray Harker sent to entity system 140 on Jul. 15, 2018, to which administration module 202 assigns a sentiment score 804c of 13. Finally, interaction activity 604d comprises a phone call survey sent by entity system 140 to Ray Harker on Jul. 22, 2018, to which administration module 202 assigns a sentiment score 804d of 23. Administration module 202 transmits the above information regarding grouped interaction thread 602a and interaction activities 604a-604d to graphical user interface module 204, which displays this information on account board 818.

Continuing the example, administration module 202 accesses interaction data 214 and groups interaction activities 604e-604f into grouped interaction thread 602b based on common subject 810 ("Birthday Call"). Interaction activity 604e comprises a phone call from entity system 140 to Ray Harker on Jun. 23, 2018. Administration module analyzes the content of phone call interaction activity 604e, such as by reviewing a recording or transcript of the conversation, and, using sentiment criteria 218, assigns it a sentiment score 804e of 58. Interaction activity 604f comprises a phone call from Ray Harker to entity system 140 on Jun. 25, 2018, to which administration module 202 assigns a sentiment score 804f of 98. Administration module 202 transmits the above information regarding grouped interaction thread 602b and interaction activities 604e-604f to graphical user interface module 204, which displays this information on account board 818.

Further continuing the example, administration module 202 accesses interaction data 214 and groups interaction activities 604g-604n into grouped interaction thread 602c based on common subject 812 ("TV Model FGH5676"). Interaction activity 604g comprises an SMS message from Ray Harker to entity system 140 on Jun. 20, 2018, regarding the purchase of a new television. Administration module analyzes the content of SMS interaction activity 604g, and assigns it sentiment score 804g of 52. Interaction activity 604h comprises a return SMS message from an employee of entity system 140 to Ray Harker on Jun. 24, 2018, to which administration module 202 assigns sentiment score 804h of 59. Interaction activity 604i comprises a subsequent SMS message from Ray Harker to entity system 140 on Jun. 28, 2018, to which administration module 202 assigns sentiment score 804i of 85. Administration module 202 transmits the above information regarding grouped interaction thread 602c and interaction activities 604g-604i to graphical user interface module 204, which displays this information on account board 818.

On Jul. 8, 2018, entity system 140 contacts Ray Harker twice, in separate interaction activities 604j and 604m. Interaction activity 604j comprises an email from one employee of entity system 140 to Ray Harker, to which administration module 202 assigns a sentiment score 804j of 79. Interaction activity 604m comprises a phone call from a separate employee of entity system 140 to Ray Harker, still regarding the television purchase matter, to which administration module 202 assigns sentiment score 804m of 79. Administration module 202 transmits the above information regarding interaction activities 604j-604m to graphical user interface module 204, which displays this information on account board 818.

As discussed above, grouped interaction thread 602a interaction activity 604c represents a marked decrease in sentiment score 804c (declining to a value of 13 from a previous value, at interaction activity 604b sentiment score 804b, of 86). Continuing with the example, administration module 202 accesses alert criteria 220 and triggers an alert 806 across all grouped interaction threads 602a-602c based on sentiment score 804c. In this example, administration module 202 triggers alert 806 according to alert criteria 220 due to the sudden drop in sentiment score 804c compared to previous sentiment scores 804, which may indicate that Ray Harker has grown unhappy with the his interactions with entity system 140. Alternative embodiments contemplate administration module 202 issuing one or more alerts 806 based on any alert criteria 220, machine learning, the learning engine and/or the rules engine within server 112 of platform administrator 110.

Continuing with the example, the employee of entity system 140 who contacted Ray Harker in interaction activity 604*j* again emails Ray Harker on Jul. 17, 2018 in interaction activity 604*k*, to which administration module 202 assigns sentiment score 804*k* of 17. The employee of entity system 140 who called Ray Harker in interaction activity 604*m* calls Ray Harker a second time on Jul. 19, 2018 in interaction activity 604*n*, to which administration module 202 assigns sentiment score 804*n* of 15. Finally, the employee who emailed Ray Harker in interaction activities 604*j* and 604*k* emails Ray Harker a third time on Jul. 27, 2018 in interaction activity 604*l*, to which administration module 202 assigns sentiment score 804*l* of 23. Administration module 202 transmits the above information regarding interaction activities 604*k*, 604*l*, and 604*n* to graphical user interface module 204, which displays this information on account board 818. In interaction activity 604*l*, the employee of entity system 140 learns that Ray Harker is no longer interested in purchasing a television, and entity system 140 has lost the sale opportunity.

Further continuing the example, administration module 202, by grouping interaction activities 604*a*-604*n* into grouped interaction threads 602*a*-602*c* and then instructing graphical user interface module 204 to display grouped interaction threads 602*a*-602*c* in the multi-path interaction chart configuration of account board 818, demonstrates that the critical event that lost entity system 140 the television sale opportunity was interaction activity 604*c*, in which sentiment score 804*c* precipitously declined regarding "Password Reset" common subject 808 of grouped interaction thread 602*a*. If interaction activities 604*k*, 604*n* or 604*d* had addressed and improved Ray Harker's negative sentiment regarding "Password Reset" common subject 808, entity system 140 might have avoided losing the television sale opportunity in interaction activity 604*l*. By displaying grouped interaction thread 602*a*-602*c* information in the manner of account board 818, embodiments allow entity system 140 to track which of its employees is responsible for negative interaction activity 604*c* that occurred on Jul. 15, 2018, and provide entity system 140 employees engaged in other grouped interaction threads 602*b*-602*c* with the opportunity to correct negative interaction activity 604*c* in grouped interaction thread 602*a* before the sale opportunity is lost.

Figure 9:
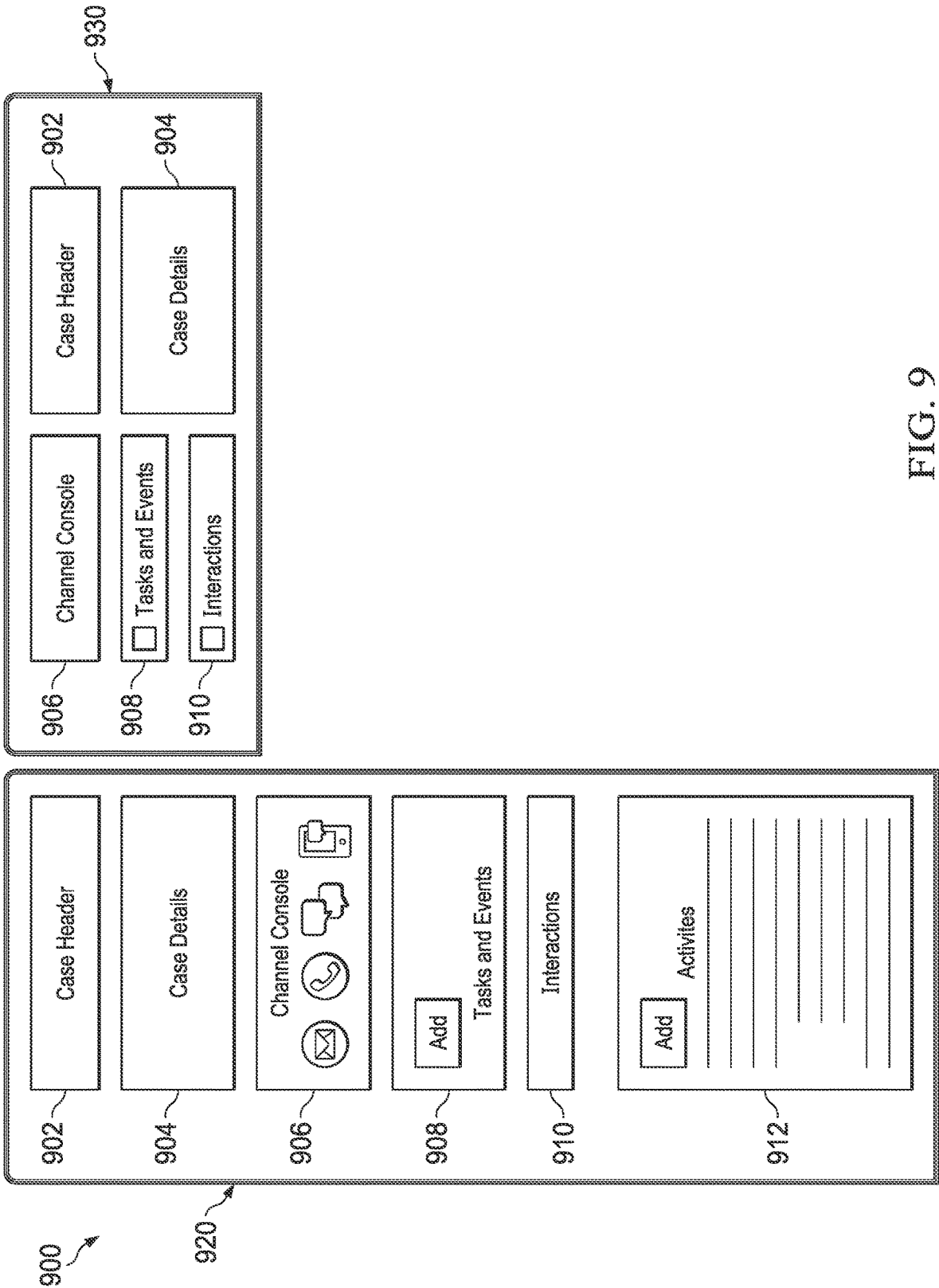
FIG. 9 illustrates another exemplary user interface, according to an embodiment.

FIG. 9 illustrates another exemplary user interface 900, according to an embodiment. User interface 900 may comprise case header screen 902, case details screen 904, channel console screen 906, tasks & events screen 908, interactions screen 910, and activities screen 912 associated with interaction activity 604. Although case header screen 902, case details screen 904, channel console screen 906, tasks & events screen 908, interactions screen 910, and activities screen 912 are shown and described, embodiments contemplate user interface 900 displaying any number of modules relating to interaction activity 604, according to particular needs. According to embodiments, graphical user interface module 204 may group case header screen 902, case details screen 904, channel console screen 906, tasks & events screen 908, interactions screen 910, and activities screen 912 into view 920, and may group case header screen

902, case details screen 904, channel console screen 906, tasks & events screen 908, and interactions screen 910 into view 930.

Administration module 202 may access entity data 210 and end user data 212, and use entity data 210 and/or end user data 212 to determine the identity of one or more specific users associated with one or more end user systems 120 or entity systems 140. Administration module 202 may transmit user identity information to graphical user interface module 204, which may generate one or more views 920, 930 or other views depending on the identity of the user, thereby displaying specific selected information to the user. Although certain views 920 and 930 are shown and described, embodiments contemplate graphical user interface module 204 grouping case header screen 902, case details screen 904, channel console screen 906, tasks & events screen 908, interactions screen 910, activities screen 912, or other screens or information into any graphical user interface display view, according to particular needs.

According to embodiments, graphical user interface module 204 populates case header screen 902, case details screen 904, channel console screen 906, tasks & events screen 908, interactions screen 910, and activities screen 912 with data pertaining to a particular interaction activity 604, which is stored in interaction data 214. According to embodiments, case header screen 902 and case details screen 904 display the name and identifying details of one or more grouped interaction threads 602 associated with interaction activity 604. Channel console screen 906 displays communication channels associated with interaction activity 604. Tasks and events module 908 displays any reminders or future calendared events associated with interaction activity 604. Interactions screen 910 lists related interaction activities 604 associated with the same grouped interaction thread 602. Finally, activities screen 912 displays any other related events or tasks information associated with interaction activity 604.

According to embodiments, administration module 202 may automatically generate and send interaction activity 604 responses to end user systems 120, based on one or more alert criteria 220. More specifically, alert criteria 220 may comprise instructions for administration module 202 to generate new interaction activity 604, such as, for example, a text message asking if end user system 120 is satisfied with its current experience, when administration module 202 assigns alert 806 to a particular interaction activity 604. In alternative embodiments, alert criteria 220 may instruct administration module 202 to generate one or more interaction activities 604 if administration module 202 assigns sentiment score 804 below a minimum threshold value to one or more interaction activities 604, administration module 202 determines that entity system 140 has not responded to interaction activity 604 in a designated amount of time, or any other alert criteria 220. Although certain alert criteria 220 are described, embodiments contemplate any number or type of alert criteria 220, according to particular needs.

Reference in the foregoing specification to "one embodiment," "an embodiment," or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for servicing multiple communication channels through a graphical user interface, comprising:

a computer, comprising a processor and memory, and configured to generate within the graphical user interface, a plurality of screens for a user, the screens comprising:

a contact screen listing selectable contacts of the user;

a type screen listing selectable tasks or events;

a direction screen listing selectable directions of communications;

a channel selector screen listing selectable communication channels; and an account board screen displaying communication interactions arranged chronologically, wherein the account board screen is displayed between an arrangement of two groupings of the contact screen, the type screen, the direction screen and the channel selector screen.

2. The system of claim 1, wherein the computer is further configured to:

group the one or more communication interactions into one or more displayed threads on the account board screen organized by one or more of: case interaction, sale interaction, contact interaction and other interaction; or group the one or more communication interactions into one or more displayed threads organized by topic.

3. The system of claim 1, wherein the one or more communication interactions comprise one or more of:

email interactions, phone interactions, text interactions and chat interactions.

4. The system of claim 1, wherein the computer is further configured to:

group the one or more communication interactions into one or more threads displayed on the account board screen, wherein one or more communication interactions in a thread are displayed sequentially according to a date and time at which each interaction took place; and display the one or more threads adjacent to each other on the account board screen.

5. The system of claim 4, wherein the one or more displayed threads are grouped according to common subject headers.

6. The system of claim 4, wherein the computer is further configured to organize or sort the one or more displayed threads and communication interactions by name, contact subject, type or channel.

7. The system of claim 4, wherein the computer is further configured to:

display on the account board screen a date divider which visually separates information displayed on the account board screen.

8. A computer-implemented method for servicing multiple communication channels through a graphical user interface, comprising:

generating, by a computer comprising a processor and memory, a plurality of screens within a graphical user interface for a user, the screens comprising:

a contact screen listing selectable contacts of the user;

a type screen listing selectable tasks or events;

a direction screen listing selectable directions of communications;

a channel selector screen listing selectable communication channels; and an account board screen displaying communication interactions arranged chronologically, wherein the account board screen is displayed between an arrangement of two groupings of the contact screen, the type screen, the direction screen and the channel selector screen.

9. The computer-implemented method of claim 8, further comprising:

grouping, by the computer, the one or more communication interactions into one or more displayed threads on the account board screen organized by one or more of: case interaction, sale interaction, contact interaction and other interaction; or grouping, by the computer, the one or more communication interactions into one or more displayed threads organized by topic.

10. The computer-implemented method of claim 8, wherein the one or more communication interactions comprise one or more of:

email interactions, phone interactions, text interactions and chat interactions.

11. The computer-implemented method of claim 8, further comprising:

grouping, by the computer, the one or more communication interactions into one or more threads displayed on the account board screen, wherein one or more communication interactions in a thread are displayed sequentially according to a date and time at which each interaction took place; and displaying, by the computer, the one or more threads adjacent to each other on the account board screen.

12. The computer-implemented method of claim 11, wherein the one or more displayed threads are grouped according to common subject headers.

13. The computer-implemented method of claim 11, further comprising:

organizing or sorting, by the computer, the one or more displayed threads and communication interactions by name, contact subject, type or channel.

14. The computer-implemented method of claim 11, further comprising:

displaying, by the computer, on the account board screen a date divider which visually separates information displayed on the account board screen.

15. A non-transitory computer-readable storage medium embodied with software for servicing multiple communication channels through a graphical user interface, the software when executed by a computer is configured to:

generate within the graphical user interface, a plurality of screens for a user, the screens comprising:

a contact screen listing selectable contacts of the user;

a type screen listing selectable tasks or events;

a direction screen listing selectable directions of communications;

a channel selector screen listing selectable communication channels; and an account board screen displaying communication interactions arranged chronologically, wherein the account board screen is displayed between an arrangement of two groupings of the contact screen, the type screen, the direction screen and the channel selector screen.

16. The non-transitory computer-readable storage medium of claim 15, wherein the software is further configured to:

group the one or more communication interactions into one or more displayed threads on the account board screen organized by one or more of: case interaction, sale interaction, contact interaction and other interaction; or group the one or more communication interactions into one or more displayed threads organized by topic.

17. The non-transitory computer-readable storage medium of claim 15, wherein the one or more communication interactions comprise one or more of:

email interactions, phone interactions, text interactions and chat interactions.

18. The non-transitory computer-readable storage medium of claim 15, wherein the software is further configured to:

group the one or more communication interactions into one or more threads displayed on the account board screen, wherein one or more communication interactions in a thread are displayed sequentially according to a date and time at which each interaction took place; and displaying the one or more threads adjacent to each other on the account board screen.

19. The non-transitory computer-readable storage medium of claim 18, wherein the one or more displayed threads are grouped according to common subject headers.

20. The non-transitory computer-readable storage medium of claim 18, wherein the software is configured to organize or sort the one or more displayed threads and communication interactions by name, contact subject, type or channel.

\* \* \* \* \*